(12) United States Patent
Saito et al.

(10) Patent No.: US 7,248,544 B2
(45) Date of Patent: Jul. 24, 2007

(54) OPTICAL HEAD AND RECORDING AND/OR REPRODUCING APPARATUS EMPLOYING SAME

(75) Inventors: Masahiro Saito, Kanagawa (JP); Norio Fukasawa, Kanagawa (JP); Kiyoshi Toyota, Tokyo (JP); Junichi Suzuki, Kanagawa (JP); Minoru Kubo, Kanagawa (JP); Souichi Murakami, Chiba (JP)

(73) Assignee: Sony Corporation (JP)

( * ) Notice: Subject to any disclaimer, the term of this patent is extended or adjusted under 35 U.S.C. 154(b) by 568 days.

(21) Appl. No.: 10/849,158

(22) Filed: May 20, 2004

(65) Prior Publication Data
US 2005/0025002 A1    Feb. 3, 2005

(30) Foreign Application Priority Data
May 30, 2003  (JP)  ............................ P2003-155675
Apr. 15, 2004  (JP)  ............................ P2004-120747

(51) Int. Cl.
*G11B 7/00*  (2006.01)
(52) U.S. Cl. ............................. 369/44.37; 369/44.12; 369/44.23; 369/112.05; 369/112.28
(58) Field of Classification Search ............ 369/44.37, 369/44.23, 44.12, 112.05, 112.28
See application file for complete search history.

(56) References Cited

U.S. PATENT DOCUMENTS

| | | | | |
|---|---|---|---|---|
| 5,189,655 A | * | 2/1993 | Ogata et al. | 369/44.23 |
| 5,708,644 A | * | 1/1998 | Hasegawa | 369/44.12 |
| 6,072,607 A | * | 6/2000 | Tajiri et al. | 369/44.23 |
| 6,192,020 B1 | * | 2/2001 | Takasuka et al. | 369/44.12 |
| 6,529,454 B1 | * | 3/2003 | Asoma et al. | 369/44.12 |
| 6,542,447 B1 | * | 4/2003 | Matsuo et al. | 369/112.28 |

* cited by examiner

*Primary Examiner*—Thang V. Tran
(74) *Attorney, Agent, or Firm*—Rader Fishman & Grauer PLLC; Ronald P. Kananen

(57) ABSTRACT

Disclosed is an optical head in which position adjustment of a photodetector light receiving surface or component parts may be simplified, production costs may be reduced and operational reliability may be improved. The optical head includes a light source 22, radiating light of a preset wavelength, an objective lens 27 for condensing the outgoing light from the light source 22 on an optical disc 2 and for condensing the return light from the optical disc 2, a beam splitter 25 for branching the optical path of the return light reflected by the optical disc 2, and for collimating the branched return light so as to be parallel to the outgoing light from the light source 22, a composite optical component including a splitting prism 30 arranged on a site of incidence of the branched return light for spatially splitting the return light, and a light receiving unit for receiving plural return light beams spatially split by the splitting prism 30 for producing focusing error signals.

30 Claims, 33 Drawing Sheets

II—II

III—III

OPTICAL HEAD AND RECORDING AND/OR REPRODUCING APPARATUS EMPLOYING SAME

BACKGROUND OF THE INVENTION

1. Field of the Invention

This invention relates to an optical head for recording and/or reproducing the information for an optical disc, which permits optical information recording and/or reproduction, such as magneto-optical disc or phase-change optical disc, and a recording and/or reproducing apparatus, employing this optical head.

This application claims the priority of the Japanese Patent Applications No. 2003-155675 filed on May 30, 2003, and No. 2004-120747 filed on Apr. 15, 2004, the entirety of which is incorporated by reference herein.

2. Description of Related Art

There has so far been known a recording and/or reproducing apparatus including a light source and an optical system which, for reproducing optical discs having different formats, such as CD (Compact Disc) or DVD (Digital Versatile Disc), is capable of radiating laser light beams of different wavelengths for coping with the respective formats.

Referring to FIG. 45, an optical system 201, provided to this sort of the recording and/or reproducing apparatus, includes, in an arraying order corresponding to the ongoing direction of the optical path, a double wavelength light source 211, selectively radiating laser light beams of respective different wavelengths to an optical disc 204, a diffractive lattice for three beams 212, for splitting the outgoing light radiated from the double wavelength light source 211 into three beams, a beam splitter 213 for separating the outgoing light and the return light from the optical disc 204 from each other, an aperture stop 214 for restricting the outgoing light to a preset numerical aperture NA, a double wavelength objective lens 215 for converging the outgoing light to the optical disc 204, and a light receiving unit 216 for receiving the return light from the optical disc 204.

As the double wavelength light source 211, a semiconductor laser is used, and selectively radiates a laser light beam of, for example, approximately 780 nm, and another laser light beam of approximately 650 nm, from a light emitting point 211a.

For producing tracking error signal by the so-called three-beam method, the diffractive lattice for three beams 212 splits the outgoing light, radiated from the double wavelength light source 211, into three beams, namely an order zero light beam and ±order one light beams.

The beam splitter 213 includes a half-mirror surface 213a for reflecting the outgoing light, radiated from the double wavelength light source 211, in the direction towards the optical disc 204. The beam splitter reflects the outgoing light, radiated from the double wavelength light source 211, in the direction towards the optical disc 204, while transmitting the return light from the optical disc 204 onto the light receiving unit 216 to separate the optical path of the outgoing light beam from that of the return light.

The light receiving unit 216 includes, on a light receiving surface 216a, a photodetector for a main beam 217, as later explained, for receiving the order zero light beam split from the return light by the diffractive lattice for three beams 212, and a set of photodetectors for side beams, not shown, for receiving the ±order one light beams, split from the return light by the diffractive lattice for three beams 212.

In the optical system 201, an astigmatic method is used for detecting focusing error signals. Thus, as shown in FIGS. 46(a) to 46(c), a light receiving surface of a photodetector for a main beam 217, receiving the return light, is substantially square-shaped, and is split into four equal light receiving areas A to D by a pair of mutually orthogonal splitting lines passing through the center of the light receiving surface. A pair of photodetectors for side beams is arranged on both sides of the photodetector for a main beam 217.

Referring to FIG. 45 the optical components of the optical system 201 are arranged on an ongoing path optical from the double wavelength light source 211 to the optical disc 204 so that image points as conjugate points of light emitting points 211a, 211b of the double wavelength light source 211 as object points are disposed on a recording surface 205 of the optical disc 204.

The optical components of the optical system 201 are also arranged on a return path from the optical disc 204 to the light receiving unit 216 so that, with the point on the recording surface 205 of the optical disc 204 as object point, the image points as conjugate points are located on the light receiving surface of the photodetector for the main beam 217 of the light receiving unit 216.

Hence, the light emitting points of the double wavelength light source 211 of the optical system 201 are in a conjugate relationship with respect to the points on the light receiving surface of the photodetector for the main beam 217 of the light receiving unit 216.

The method for producing a focusing error signal by the light receiving areas A to D of the photodetector for the main beam 217 is hereinafter explained.

First, in case the double wavelength objective lens 215 is at an optimum position relative to the recording surface 205 of the optical disc 204 and is focused with respect to the recording surface 205 of the optical disc 204, that is, in a just-focus state, the profile of a beam spot on the light receiving surface of the photodetector for the main beam 217 is circular, as shown in FIG. 46(b).

However, when the double wavelength objective lens 215 has excessively approached to the recording surface 205 of the optical disc 204, the double wavelength objective lens deviates from the just focus state, such that, due to the astigmatism generated as a result of the passage through the composite optical component 212 of the return light separated by a diffraction lattice for a beam splitter 212b, the beam spot on the light receiving surface of the photodetector for the main beam 217 is of an elliptical profile with the long axis of the ellipsis astride the light receiving area A and the light receiving area C, as shown in FIG. 46(a).

If the double wavelength objective lens 215 is moved excessively away from the recording surface 205 of the optical disc 204, the double wavelength objective lens deviates from the just focus state, such that, due to the astigmatism generated as a result of the passage through the composite optical component 213 of the return light separated by the diffraction lattice for a beam splitter 212, the beam spot on the light receiving surface of the photodetector for a main beam 217 is of an elliptical profile with the long axis of the ellipsis astride the light receiving area B and the light receiving area D, as shown in FIG. 46(c). The beam spot profile in this case is elliptical with the long axis direction inclined 90° from the beam spot profile shown in FIG. 46(a).

With return light outputs SA, SB, SC and SD from the respective light receiving areas A to D of the photodetector for the main beam 217, the focusing error signals FE may be calculated as shown by the following equation (6):

$$FE = (SA + SC) - (SB + SD) \tag{6}$$

That is, in the just-focus state of the photodetector for the main beam 217, in which the double wavelength objective lens 215 is at the focused position, the focusing error signal FE, calculated by the above equation (6), is zero, as shown in FIG. 46(b).

If, with the photodetector for the main beam 217, the double wavelength objective lens 215 has excessively approached to or moved excessively away from the recording surface 205 of the optical disc 204, the focusing error signal FE is positive or negative, respectively.

The tracking error signal TE may be produced by the photodetectors for side beams receiving the±order one light beams, split by the diffraction lattice for three beams 212 and calculating the difference of the respective outputs of the photodetectors for side beams.

With the optical pickup device, having the optical system 201, constructed as described above, the double wavelength objective lens 215 is actuated and displaced, based on the focusing error signal FE obtained by the photodetector for the main beam 217 of the light receiving unit 216, and the tracking error signal TE obtained by the photodetector for side beams, whereby the double wavelength objective lens 215 is moved to the focused position with respect to the recording surface 205 of the optical disc 204, such that the outgoing light is focused on the recording surface 205 of the optical disc 204 to reproduce the information from the optical disc 204.

However, in the above-described optical system, in which the beam splitting is made on the photodetector, the requirement for position accuracy on the light receiving surface of the photodetector is extremely severe. Additionally, since the focusing error signals are produced thanks to the severe position accuracy of the light emitting unit, light receiving unit or other components, an extremely severe tolerance is imposed on the shape or manufacture methods of base components of the optical pickup, or on the shape or the arranging method of other components.

For example, in an optical system, shown in FIG. 45, the optical axis of the return light is deviated by an error in the mounting angle or the error in thickness of the beam splitter 213. If the optical axis of the return light is deviated to the slightest extent in one or the other direction from the center of the photodetector for the main beam 217, the output for the just-focus state is not zero, and hence the focusing error FE is offset.

SUMMARY OF THE INVENTION

It is an object of the present invention to provide an optical head in which an optimum focusing error may be obtained without being affected by slight deviation of the mounting angle of the beam splitter or by the minor thickness error, and a recording and/or reproducing apparatus employing this optical head.

It is another object of the present invention to provide an optical head with which superb focusing and tracking error signals may be obtained without imposing strict requirements on position accuracy of component parts, such as light emitting or light receiving units, and a recording and/or reproducing apparatus employing the optical head.

For accomplishing the above objects, the present invention provides an optical head comprising a light source for radiating light of a preset wavelength, a light condensing optical component for condensing the light radiated from the light source on an optical disc and for condensing the return light from the optical disc, an optical path branching optical component for branching the optical path of the return light reflected from the optical disc and for collimating the branched return light so as to be parallel to the light radiated from the light source, a composite optical component arranged at a position on which falls the return light branched by the optical path branching optical component, the composite optical component including light splitting means for spatially splitting at least the branched return light, and a light receiving unit having a plurality of light receiving areas for receiving a plurality of return light beams obtained on spatial splitting by the light splitting means.

The light source of the optical head for an optical disc recording and/or reproducing apparatus according to the present invention may radiate a plurality of light beams of respective different wavelengths, while the return light beams from the optical disc of the plural light beams of the respective different wavelengths may fall on substantially the same site on the light splitting means.

The optical head for an optical disc recording and/or reproducing apparatus according to the present invention further comprises a diffraction component arranged on an optical path between the light source and the light condensing optical component for diffracting the light radiated from the light source for splitting the light into a plurality of light beams, wherein the return light from the optical path branching optical component traverses an area of the diffraction component other than an area thereof exhibiting the diffractive effect, the light receiving unit receiving return light from the optical disc of a plurality of light beams obtained on diffraction by the diffraction component.

The composite optical component forming the optical head for an optical disc recording and/or reproducing apparatus according to the present invention may be arranged on an optical path between the optical path branching optical component and the light receiving unit, and the light radiated from the light source may traverse an area within the composite optical component other than an area of the light splitting means.

The optical head according to the present invention may further comprise a monitor light receiving component for monitoring an output of light radiated from the light source. The composite optical component may include control light routing means for separating the light radiated from the light source into signal light condensed on the optical disc and control light, the control light routing means routing the control light to the monitor light receiving component.

The optical head according to the present invention may further comprise a diffraction component arranged on an optical path between the light source and the light condensing optical component for diffracting the light radiated from the light source for splitting the radiated light into a plurality of light beams. The light splitting means is composed of first splitting means arranged in the vicinity of the focal point of the return light from the optical disc of the order zero diffracted light diffracted by the diffraction component, for splitting the order zero diffracted light into a plurality of light beams, and second splitting means arranged in the vicinity of the focal point of the return light from the optical disc of the ±order one diffracted light diffracted by the diffraction component, for splitting the ±order one diffracted light into a plurality of light beams. The light receiving unit receives the plural order zero diffracted light beams, obtained on splitting by the first splitting means, to generate a focusing error signal, while receiving the plural order one diffracted light beams, obtained on splitting by the second splitting means, to generate a tracking error signal.

The optical head according to the present invention may further comprise light condensing means arranged on an optical path between the light splitting means and the light receiving unit having plural light receiving areas for condensing the plural return light beams obtained on splitting by the light splitting means.

For accomplishing the above objects, the present invention also provides an optical head comprising a light source for radiating light of a preset wavelength, a light condensing optical component for condensing the light radiated from the light source on an optical disc and for condensing the return light from the optical disc, an optical path branching optical component for branching the optical path of the return light reflected from the optical disc and for collimating the branched return light so as to be parallel to the light radiated from the light source, a composite optical component arranged on a site on which falls the return light branched by the optical path branching optical component, the composite optical component including light splitting means for spatially splitting at least the branched return light, and a light receiving unit having a plurality of light receiving areas for receiving a plurality of return light beams obtained on spatial splitting by the light splitting means. The light source is mounted on a heat dissipating member, which heat dissipating member is provided with an assembly of a substrate or another heat dissipating member and wiring means. The light receiving unit is arranged on the assembly of the substrate or the other heat dissipating member and the wiring means.

For accomplishing the above objects, the present invention also provides a recording and/or reproducing apparatus including an optical head for recording and/or reproducing the information for an optical disc, and disc rotating driving means for rotationally driving the optical disc, wherein the optical disc comprises a light source for radiating light of a preset wavelength, a light condensing optical component for condensing the light radiated from the light source on an optical disc and for condensing the return light from the optical disc, an optical path branching optical component for branching the optical path of the return light reflected from the optical disc and for collimating the branched return light so as to be parallel to the light radiated from the light source, a composite optical component arranged at a position on which falls the return light branched by the optical path branching optical component, the composite optical component including light splitting means for spatially splitting at least the branched return light, and a light receiving unit having a plurality of light receiving areas for receiving a plurality of return light beams obtained on spatial splitting by the light splitting means.

For accomplishing the above objects, the present invention also provides a recording and/or reproducing apparatus including an optical head for recording and/or reproducing the information for an optical disc, and disc rotating driving means for rotationally driving the optical disc, wherein the optical disc comprises a light source for radiating light of a preset wavelength, a light condensing optical component for condensing the light radiated from the light source on an optical disc and for condensing the return light from the optical disc, an optical path branching optical component for branching the optical path of the return light reflected from the optical disc and for collimating the branched return light so as to be parallel to the light radiated from the light source, a composite optical component arranged at a position on which falls the return light branched by the optical path branching optical component, the composite optical component including light splitting means for spatially splitting at least the branched return light, and a light receiving unit having a plurality of light receiving areas for receiving a plurality of return light beams obtained on spatial splitting by the light splitting means. The light source is mounted on a heat dissipating member, which heat dissipating member is provided with an assembly of a substrate or another heat dissipating member and wiring means. The light receiving unit is arranged on the assembly of the substrate or the other heat dissipating member and the wiring means.

With the optical head of the present invention, the optical path branching optical component collimates the branched return light so as to be parallel to the light radiated from the light source, so that it is possible to reduce the effect of the error in the thickness or the mounting angle of the optical path branching optical component to realize optimum focusing error signals. Moreover, since the light is split by light splitting means into plural light beams in advance of light incidence on the photodetector, it is possible to lessen the requirement for position accuracy of the photodetector light receiving surface. The result is that the photodetector may be reduced in the production cost and improved in operational reliability.

Moreover, with the optical head of the present invention, the light is split, such as by a prism, prior to falling on the photodetector, instead of being split into plural light beams on the photodetector, as conventionally, so that it is possible to lessen the requirement for position accuracy on the photodetector light receiving surface. That is, if only a proper area is maintained for each of the four light receiving surfaces of the photodetector, it is only required that the four light beams fall on the respective surfaces, while it does not matter on which location of each surface falls the light beam, so that a high position accuracy is not needed. That is, optimum focusing and tracking error signals may be generated without requiring stringent position accuracy. Hence, it is possible to suppress the production cost of the photodetector and to simplify the photodetector position adjustment in the optical head production process as well as to improve the operational reliability.

Moreover, with the optical head according to the present invention, in which both the light beam of the ongoing optical path and the light beam of the return optical path traverse the same optical component, optimum focusing error signals may be obtained without requiring strict mounting accuracy of the optical components. In addition, it is possible to enlarge the gamut of selection of the shape and the production process of the base portion of the optical head, to moderate the constraint on the shape or the arranging method of the other components. The result is the improved operational reliability of the optical head, increased degree of freedom in designing or the gamut of selection of the manufacturing methods and the reduced cost.

Additionally, with the optical head of the present invention, in which the composite optical component separates the radiated light into signal light and control light to route the control light to the monitor light receiving component, it is unnecessary to discretely provide the monitor light receiving unit and the light receiving unit for signal detection and hence number of component parts or the production steps is not increased as a consequence of discretely providing a number of the semiconductor devices of analogous properties.

With the optical head of the present invention, in which the light splitting means includes first splitting means for splitting the main beam and second splitting means for splitting the side beams, it is possible to lessen the requirement for photodetector position accuracy with respect to the incident beam position for producing push-pull signals for main and side beams. That is, if only a proper area is maintained for each of the four light receiving surfaces of the photodetector for the main beam and each of the two light receiving surfaces of the photodetector for the side beams, it is only required that the main and side beams fall on the respective surfaces of the first and second splitting means, respectively, while it does not matter on which location of each surface falls the light beam, so that a high position accuracy is not a requirement. That is, optimum focusing and tracking error signals may be generated without requiring stringent position accuracy. Thus, the requirement for position accuracy of the beam splitting lines of the photodetector may be lower than with the conventional system, so that it is possible to suppress the production cost of the photodetector and to simplify the photodetector position adjustment in the optical head production process as well as to improve the operational reliability.

With the optical head of the present invention, in which the light beams, obtained on splitting by light splitting means, may be condensed by the light condensing means, the light receiving unit may be reduced in size. Hence, a certain merit may be acquired in frequency characteristics, while production costs may be reduced and the optical head may be improved in performance.

With the optical head, according to the present invention, the light source is mounted on a heat dissipating member, for example, a metal holder having high heat dissipating properties, the light receiving unit is mounted on an assembly of a substrate or another heat dissipating member and wiring means, and heat is dissipated to the heat dissipating member, such as a metal holder, through this assembly of the substrate or the other heat dissipating member and wiring means, so that the heat generated by the light source may efficiently be dissipated, even in cases wherein the laser power consumption is high, such as during high multiple speed recording. The result is that the laser temperature may be suppressed to a lower value to lengthen the useful life of the laser unit. That is, with the optical head, in which optimum focusing and tracking errors may be obtained without requiring high accuracy in the arrangement of the optical system, the light source, as the main heat generating unit, and the light receiving unit, may be arranged as a sole unitary structure which may be constructed by a member of high heat dissipating properties, and hence the heat dissipation may be achieved readily efficiently.

With the recording and/or reproducing apparatus, according to the present invention, the optical path branching optical component collimates the branched return light so as to be parallel to the light radiated from the light source, thereby reducing the effect of errors in thickness or mounting angle of the optical path branching optical component. The result is that operational reliability may be achieved and optimum focusing errors may be produced to optimize the recording and/or reproducing operations. Moreover, the light from the optical head is split into plural light beams in advance by light splitting means, before the light is incident on the photodetector, so that the requirement for position accuracy of the photodetector light receiving surface nay be decreased to improve the operational reliability as well as to optimize the recording and/or recording and/or reproducing operations.

Furthermore, with the recording and/or reproducing apparatus, according to the present invention, in which light from the optical head is split into plural light beams in advance by light splitting means, before the light is incident on the photodetector, the requirement for position accuracy of the photodetector light receiving surface may be lessened to improve the operational reliability as well as to optimize the recording and/or reproducing operations.

With the recording and/or reproducing apparatus, according to the present invention, in which the light source is mounted on a heat dissipating member, for example, a metal holder formed e.g. by zinc diecasting, the light receiving unit is mounted on an assembly of a substrate or another heat dissipating member, and wiring means, and heat is dissipated to the heat dissipating member, such as the metal holder, through this assembly of the substrate or the other heat dissipating member and wiring means. Hence, the power consumption of the laser unit may be increased and the temperature of the laser unit may be lowered even during high multiple speed recording to lengthen the useful life of the laser unit.

DESCRIPTION OF THE PREFERRED EMBODIMENTS

Figure 1:
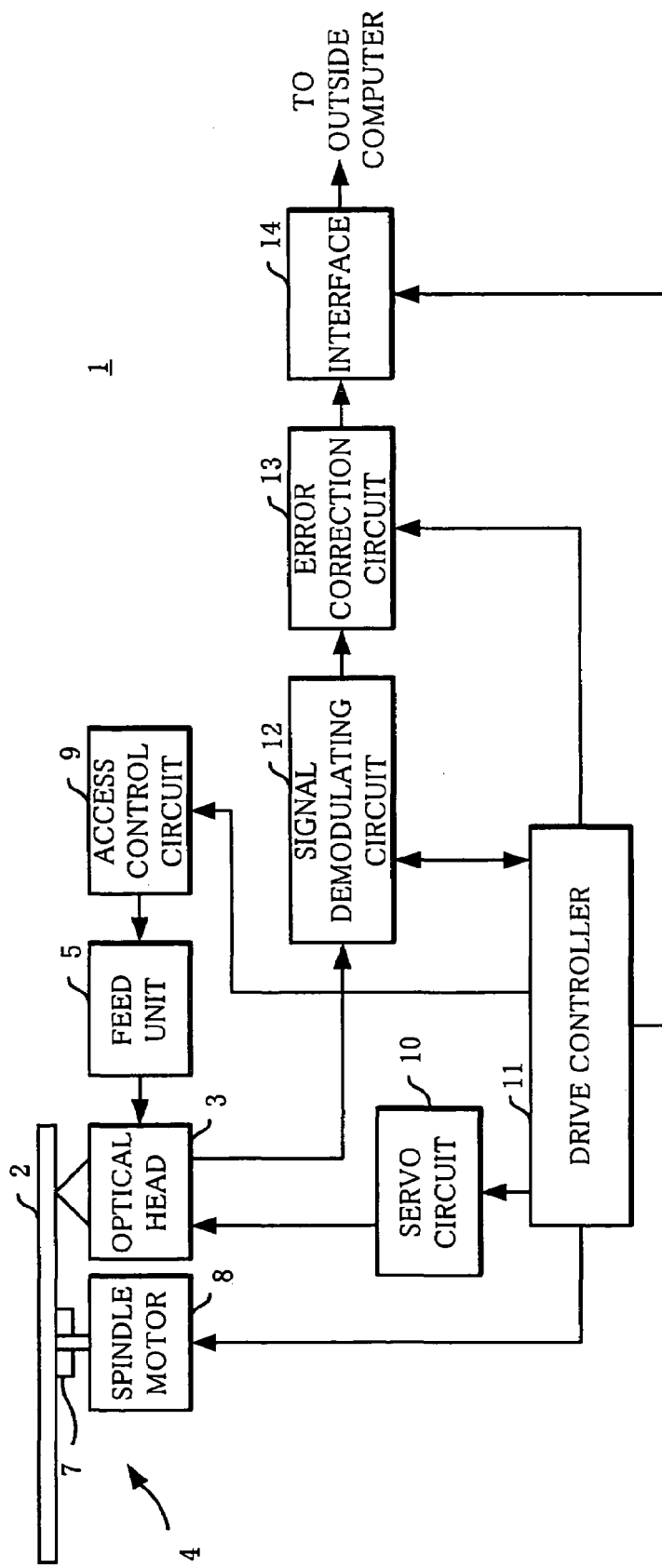
FIG. 1 is a block diagram showing the structure of a recording and/or reproducing apparatus according to the present invention.

Referring to the drawings, an optical head according to the present invention, and a recording and/or reproducing apparatus, employing this optical head, are explained in detail.

The recording and/or reproducing apparatus 1, according to the present invention, is designed and arranged for recording and/or reproducing the information for an optical disc 2, such as CD (Compact Disc), DVD (Digital Versatile Disc), an optical disc, such as CD-R (Recordable) and DVDR (Recordable), on which the information can be post-written, an optical disc, such as CD-RW (ReWritable), DVD-RW (ReWritable) or DVD+RW (ReWritable), on which the information can be rewritten, an optical disc, which permits high density recording, employing semiconductor laser with a short light emitting wavelength on the order of 405 nm (blue to purple), or a magneto-optical disc, as shown in FIG. 1. In the following explanation, the 'recording and/or reproduction' is sometimes expressed simply as 'recording or reproduction'. In particular, it is assumed in the following explanation that a CD or a DVD is used as the optical disc 2 and that the information is reproduced or recorded from the CD or the DVD.

The recording and/or reproducing apparatus 1 includes an optical head 3 for recording or reproducing the information from the optical disc 2, a disc rotating and driving unit 4 for rotationally driving the optical disc 2, a feed unit 5 for causing movement of the optical head 3 along the radius of the optical disc 2, and a controller 6 for controlling the optical disc 3, disc rotating and driving unit 4 and the feed unit 5

The disc rotating and driving unit 4 includes a disc table 7, on which the optical disc 2 is set, and a spindle motor 8 for rotationally driving the disc table 7. The feed unit 5 includes a support base, not shown, for supporting the optical head 3, a main shaft and a sub-shaft, also not shown, for movably supporting the support base, and a sled motor, also not shown, for causing movement of the support base.

The controller 6 includes an access control circuit 9 for driving and controlling the feed unit 5 for controlling the position of the optical head 3 along the radius of the optical disc 2, a servo circuit 10 for driving and controlling a biaxial actuator of the optical head 3, and a drive controller 11 for controlling the servo circuit 10, as shown in FIG. 1. This controller 6 also includes a signal demodulating circuit 12 for demodulating the signals from the optical head 3, an error correction circuit 13 for error-correcting the demodulated signals, and an interface 14 for outputting the error-corrected signals to electronic equipment, such as an external computer.

The above-described recording and/or reproducing apparatus 1 operates for rotationally driving the disc table 7, carrying the optical disc 2 thereon, by the spindle motor 8 of the disc rotating and driving unit 4, and for driving and controlling the feed unit 5, responsive to the control signal from the access control circuit 9 of the controller 6, to cause the optical head 3 to be moved to a position in register with a desired recording track of the optical disc 2, in order to record or reproduce the information for the optical disc 2.

The above-described recording or reproducing optical head is explained in detail.

Figure 2:
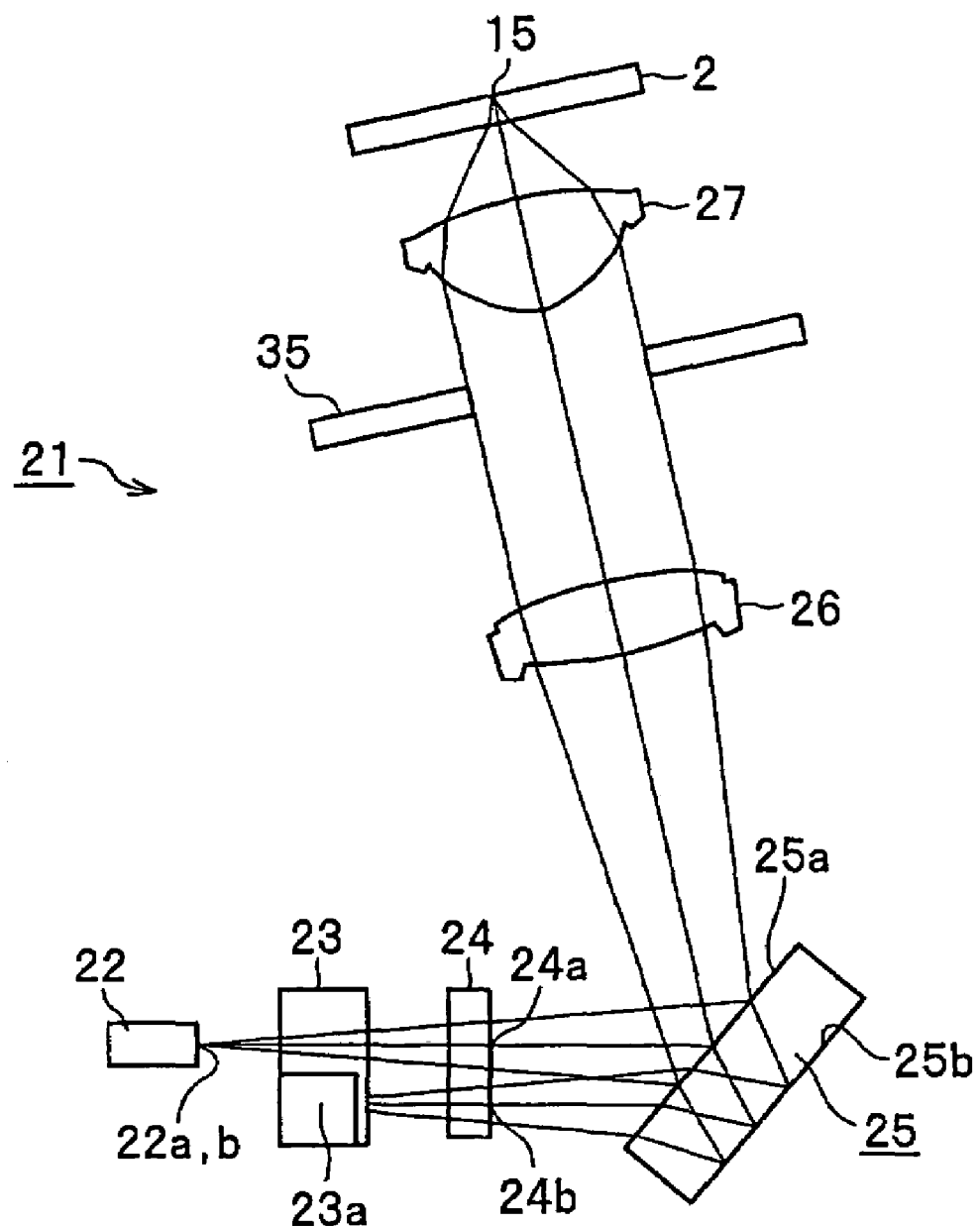
FIG. 2 shows schematics of an illustrative optical system of an optical head embodying the present invention.

An optical head 21 according to the present invention includes a light source 22, an objective lens 27, as a light condensing optical component for condensing the light radiated from the light source 22 onto the optical disc 2, a beam splitter 25, as an optical path branching optical component, a composite optical component 23, and a light receiving unit 29, as shown in FIG. 2.

This light source 22 is the semiconductor laser radiating an outgoing light beam of a preset wavelength or plural outgoing light beams of respective different wavelengths. The light source 22 may also be provided with plural radiating units for radiating plural outgoing light beams of respective different wavelengths. In the present embodiment, this light source is a double wavelength semiconductor laser unit, and is, for example, a semiconductor laser unit including radiating units 22a, 22b mounted in proximity to each other for radiating a laser light beam with the wavelength of, for example, the order of 780 nm, and a laser light beam with the wavelength of, for example, the order of 650 nm, as shown for example in FIG. 3. This semiconductor laser unit is a composite light emitting device, including a monitor photodetector for automatically controlling the light emission output. The separation between the radiating units 22a, 22b is on the order of 100 to 300 µm.

This light source 22 may be switched so that, when the optical disc 2 is an optical disc of a CD format, the light source radiates a laser light beam with the wavelength of approximately 780 nm, based on a control signal from the drive controller 11, and so that, when the optical disc 2 is an optical disc of a DVD format, the light source radiates a laser light beam with the wavelength of approximately 650 nm, based on a control signal from the drive controller 11.

The objective lens 27, as the light condensing optical component, is an objective lens for two wavelengths having two focal points. In the present embodiment, in which a double wavelength semiconductor laser having two radiating units is used as the light source 22, the objective lens for two wavelengths is used. However, if the light source used radiates a light beam with a sole wavelength, the objective lens with a sole wavelength may be used.

This objective lens 27 is carried for movement by a biaxial actuator, not shown. The objective lens 27 is moved in a direction towards and away from the optical disc 2 and in a direction along the radius of the optical disc 2, by the biaxial actuator, based on the tracking error signals and the focusing error signals, generated by the return light from the optical disc 2, received by a light receiving unit, as later explained. The objective lens 27 condenses the laser light, radiated from the light source 22, so that the laser light is focused at all times on the signal recording surface of the optical disc 2. The objective lens 27 also causes the so focused laser light to follow the recording track formed on the signal recording surface of the optical disc.

The beam splitter 25, as the optical path branching optical component, is made up by a half mirror surface 25a, provided on a side thereof towards the light source 22, and a mirror surface 25b, provided on a side thereof remote from the light source 22. This half mirror surface 25a reflects a portion of the incident laser light, while transmitting the remaining light portion. The beam splitter 25 is provided between the light source 22 and the objective lens 27, as shown in FIG. 2.

This beam splitter 25 branches the optical path of the return light, reflected by the optical disc 2, and collimates the return light, branched in the optical path, into light parallel to the outgoing light from the light source 22. A collimator lens 26, for collimating the light, transmitted therethrough, is provided between the beam splitter 25 and the objective lens 27. An aperture stop 35 for restricting the laser light beam, transmitted through the collimator lens 26, to a preset numerical aperture NA, is provided between the collimator lens 26 and the objective lens 27.

The objective lens 27 used is smaller in diameter than the collimator lens 26. Hence, even in case the objective lens 27 is moved for reading the disc, there is no risk of the optical axes of the collimator lens 26 and the objective lens 27 being offset to prevent lack of light. The aperture stop 35 is provided for eliminating the laser light, other than the readout light, which has passed through the collimator lens 26 larger in diameter than the objective lens 27.

Figure 4:
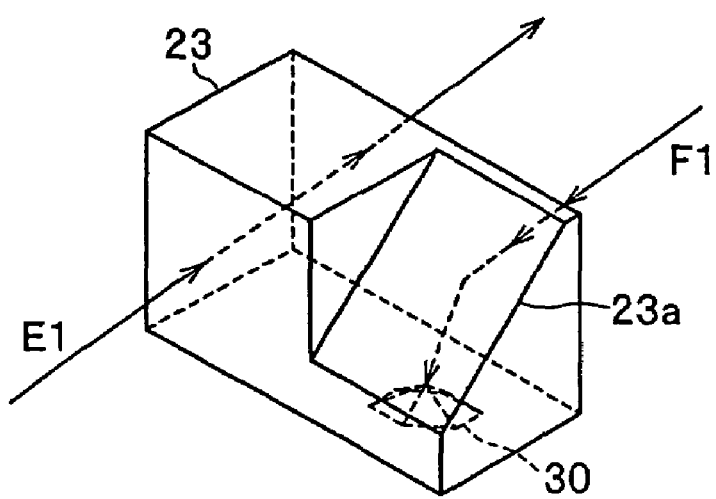
FIG. 4 is a perspective view of a composite optical component forming the optical head according to the present invention.
Figure 5:
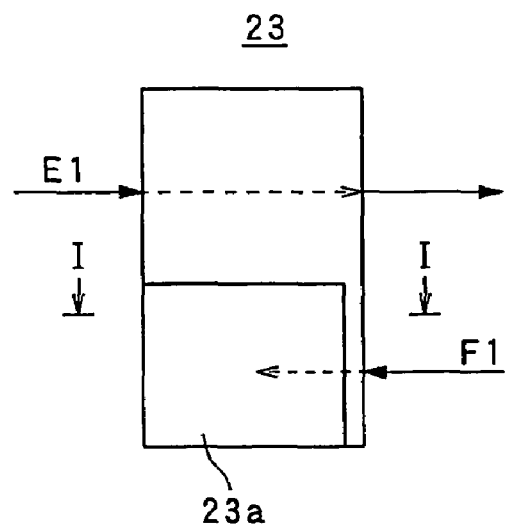
FIG. 5 is a front view of the composite optical component forming the optical head according to the present invention.
Figure 6:
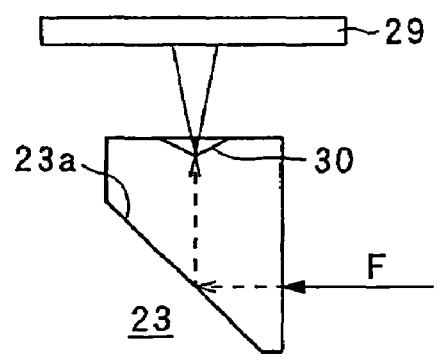
FIG. 6 is a cross-sectional view, taken along line I-I of FIG. 5, showing the optical head embodying the present invention.

The composite optical component 23 is provided on an optical path between the light source 22 and the beam splitter 25, as shown in FIG. 2. Referring to FIGS. 4 to 6, the composite optical component 23 includes, on an ongoing light side thereof on which falls an outgoing light beam E1, a light transmitting component, while including, on a return light side thereof on which falls a return light beam F1, a mirror surface 23a, as a reflection means. This mirror surface is provided to the light source side on which falls the return light beam. The composite optical component 23 also includes a light splitting means provided to a location on which falls the return light reflected by this mirror surface 23a.

Figure 7A:
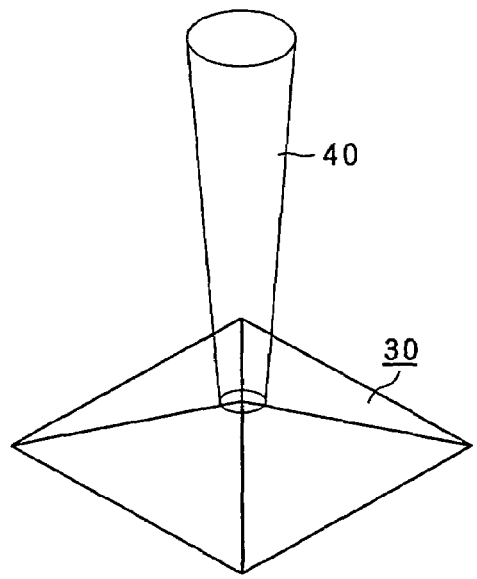
FIG. 7(a) is a perspective view showing the state in which the return light is incident on light splitting means forming the optical head according to the present invention.
Figure 7B:
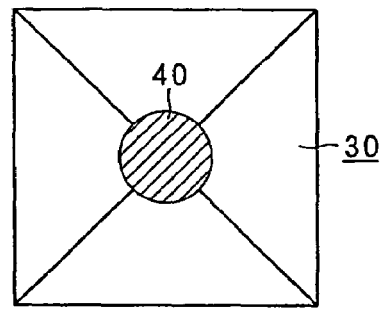
FIG. 7(b) is a plan view showing the state in which the return light is incident on light splitting means forming the optical head according to the present invention.
Figure 8:
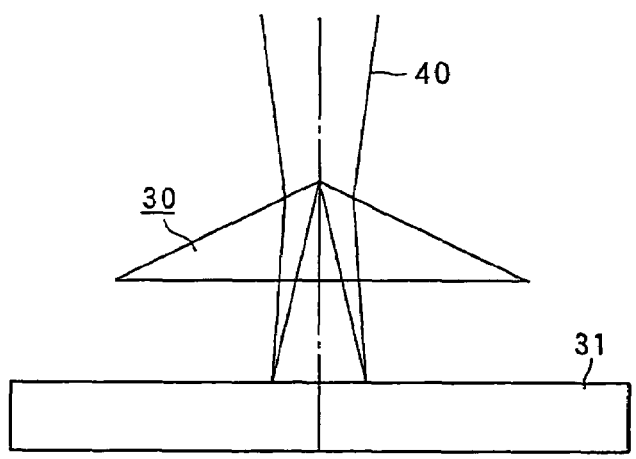
FIG. 8 shows the state in which a light beam is incident on the composite optical component forming the optical head according to the present invention.

This light splitting means is a light beam splitting prism 30 formed to a substantially square pyramidal shape. Referring to FIGS. 7 and 8, the return light, incident on an apex point of the substantially square pyramidal shape, with the square shaped surface as a bottom surface, is spatially splits into four portions. The light beam splitting prism 30 is arranged at right angles to the optical axis of a main beam 40 of the three beams obtained on splitting with a diffraction lattice which will be explained subsequently.

The composite optical component 23 is formed by injection molding a resin material. Meanwhile, the material that makes up the composite optical component 23 is not limited to the resin material and may also be a transparent optical material, such as vitreous material. The composition of the material may also be changed by using two or more of the above-mentioned optical materials in combination.

A plate-shaped optical component 24 is provided between the composite optical component 23 and the beam splitter 25. This plate-shaped optical component 24 includes a diffraction lattice for generating three beams 24a for diffracting the light beam incident on the ongoing optical path to form plural light beams. This diffraction lattice for generating three beams 24a splits the incident light beam into three light beams, namely the order zero light beam and±order one light beams. A tracking error signal may be produced by plural light beams, obtained on splitting by the diffraction lattice for generating three beams 24a.

The plate-shaped optical component 24 also includes a diffraction lattice for optical path synthesis 24b for diffracting the light beam incident on the return optical path side thereof for diffracting a light beam having a certain preset wavelength. This diffraction lattice for optical path synthesis 24b diffracts the laser light beams, radiated from the radiating units 22a, 22b, arranged in proximity to each other, to the same site on the light beam splitting prism 30.

The optical paths of the laser light beams, diffracted by the diffraction lattice for optical path synthesis 24b, are synthesized and confounded with each other on the same site. The diffraction lattice for optical path synthesis 24b transmit the laser light with the wavelength of 650 nm and diffract the laser light with the wavelength of 780 nm to the same optical path as that of the laser light with the wavelength of 650 nm. In this manner, the diffraction lattice for optical path synthesis 24b is able to illuminate the laser light, radiated from the different radiating units, on an apex point of the light beam splitting prism 30.

The diffraction lattice for optical path synthesis transmits the laser light with the wavelength of 650 nm and diffracts the laser light with the wavelength of 780 nm, such that, although these laser light beams fall on the apex point of the light beam splitting prism 30 with different angles of incidence, the oblique surfaces of the splitting prism are designed to cause no total reflection with the angles of incidence of the respective laser light beams. The light receiving unit 29 is also designed not to be affected by the angles of incidence. Hence, the diffraction lattice for optical path synthesis 24b is able to illuminate the laser light, radiated from different radiating units, on the apex point of the splitting prism 30, so that these laser light beams will be received by the light receiving unit 29.

Here, the diffraction lattice for optical path synthesis is provided on the return light path of the plate-shaped optical component 24. Alternatively, the diffraction lattice for optical path synthesis may be provided on the optical path of the ongoing light.

The diffraction lattice for optical path synthesis, provided on the optical path of the ongoing light, synthesizes the respective optical paths of the outgoing light beams, radiated from the plural radiating units, and diffracts these light beams so that these light beams will be confounded on the optical axis of the objective lens 27. The outgoing light beams, radiated from the plural radiating units, and diffracted by the diffraction lattice for optical path synthesis, are on the same optical path on the optical axis of the objective lens 27, and hence are incident on approximately the same site on the splitting prism 30.

Figure 9:
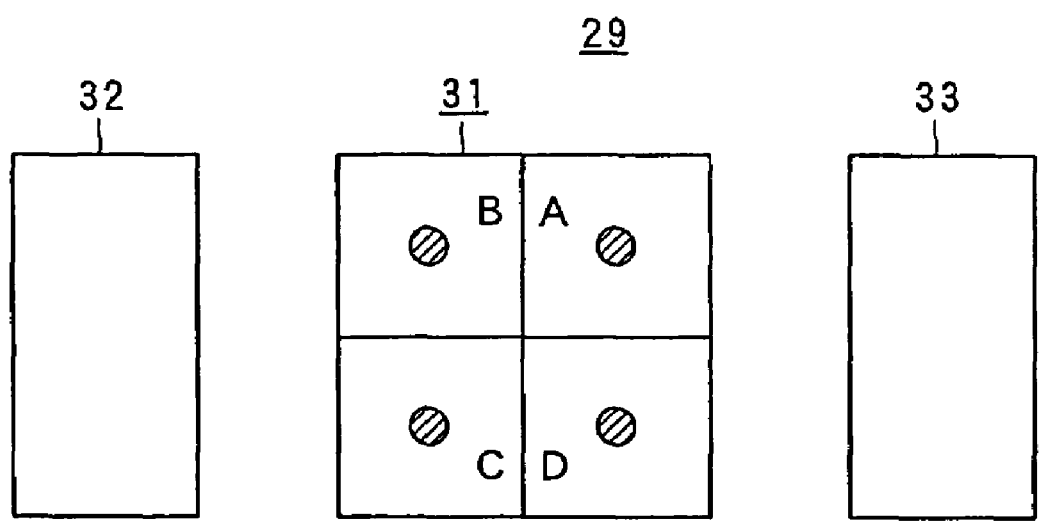
FIG. 9 shows a photodetector for a main beam and photodetectors for side beams forming the optical head according to the present invention.

The light receiving unit 29 is made up by a first light receiving unit and a second light receiving unit. The first light receiving unit is a photodetector for the main beam 31, and includes plural light receiving areas for receiving plural return light beams spatially split by the splitting prism 30. This photodetector includes light receiving areas A to D, split by a pair of splitting lines extending at right angles to each other, as shown in FIG. 9.

The second light receiving unit is a set of approximately square-shaped photodetectors for side beams 32, 33 for receiving two side beams, which are±order one light beams, of the plural light beams diffracted by the plate-shaped optical component 24. These photodetectors for side beams 32, 33 are located on both sides of the photodetector for the main beam 31, as shown in FIG. 9.

The optical paths of the laser light beams, radiated from the light source 22 in the optical head 21, are hereinafter explained.

Referring to FIG. 2, the light beams, radiated from the radiating units 22a, 22b of the light source 22, are transmitted through the composite optical component 23, and split by the diffraction lattice for generating three beams 24a of the plate-shaped optical component 24 into three beams (order zero diffracted light, referred to below as a main beam, and±order one diffracted light beams, referred to below as side beams), so as to be radiated and reflected by the half-mirror surface 25a of the beam splitter 25. The light transmitted at this time through the half-mirror surface 25a does not affect subsequent process steps.

The light beam reflected by the half-mirror surface 25a is collimated by the collimator lens 26 and restricted by the aperture stop 35 so as to be condensed by the objective lens 27 on a recording surface 15 of the optical disc 2.

The light condensed on the optical disc 2 is reflected by the optical disc 2. The main beam and the side beams (these collectively being termed the return light) are transmitted through the objective lens 27 and the collimator lens 26 so as to be re-incident on the beam splitter 25. The return light, incident on the beam splitter 25, is transmitted through the half-mirror surface 25a, so as to be reflected by the mirror surface 25b and retransmitted and radiated through the half-mirror surface 25a. The light reflected by the half-mirror surface 25a when the return light is making entrance/exit in the beam splitter 25 does not affect the subsequent process. The return light radiated from the beam splitter 25 is parallel to the outgoing light which is radiated from the light source. 22 to fall on the beam splitter 25.

The return light from the optical disc 2 is reflected by the mirror surface 25b on the opposite side of the half-mirror surface 25a and re-radiated from the half-mirror surface 25a. Hence, the return light re-radiated from the half-mirror surface is parallel to the outgoing light from the light source 22, without dependency on the mounting angle or thickness error of the beam splitter 25.

Figure 10:
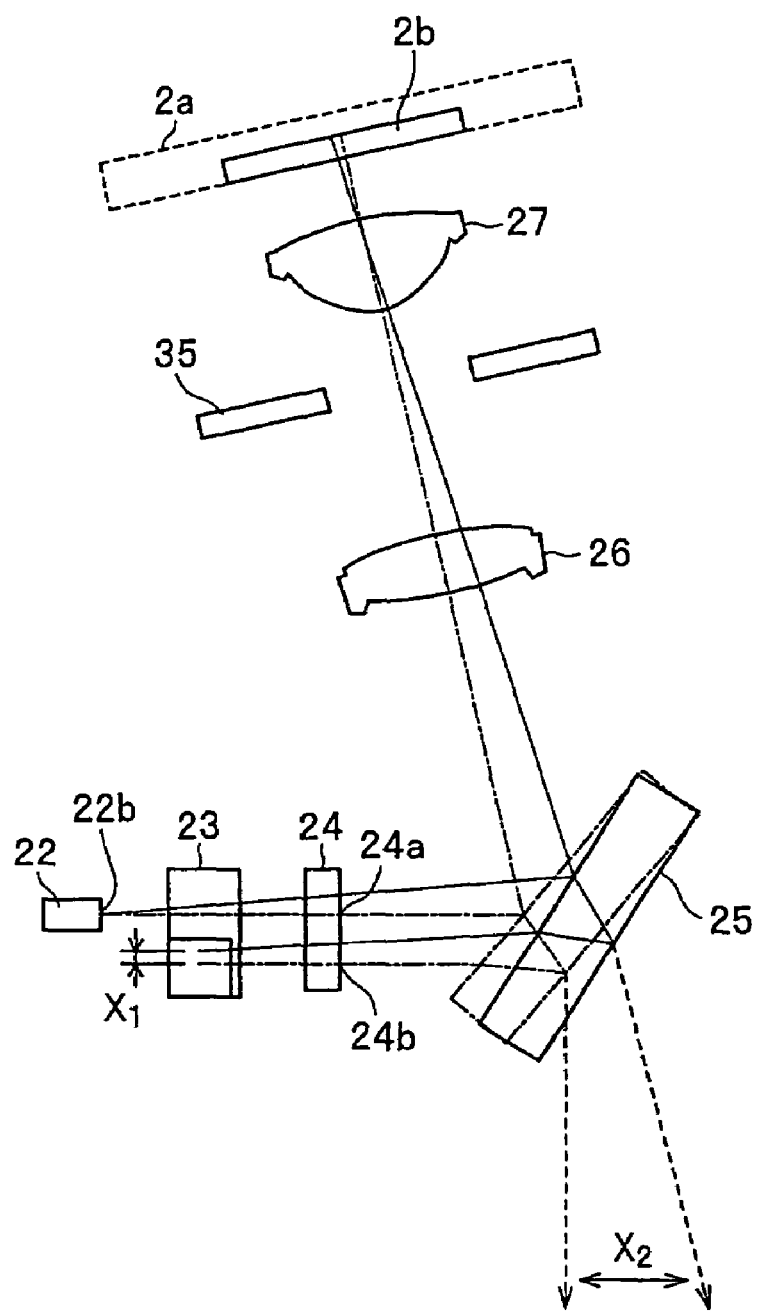
FIG. 10 shows changes in the optical path in case the mounting angle of a beam splitter forming the optical head according to the present invention is changed.

If, at this time, the mounting angle of the beam splitter 25 is deviated, the deviation is X1 with the optical head 21 according to the present invention, as shown in FIG. 10. This deviation X1 is smaller than the deviation X2 in the case of the optical head in which the light beams traverses the beam splitter. Since the optical head is less susceptible to variations in the mounting angle and in the thickness of the beam splitter 25, the return light is parallel at all times to the outgoing light from the light source 22, thus allowing the lessening the requirements for position accuracy.

The return light transmitted through the half-mirror surface 25a is separated from the optical path of the light radiated from the light source 22 so as to be reincident on the plate-shaped optical component 24. The return light is then diffracted by the diffraction lattice for optical path synthesis 24b and radiated so that the optical axes of the outgoing light of a longer wavelength and the outgoing light of a shorter wavelength, radiated from the radiating units 22a, 22b, provided in proximity to each other to the double wavelength semiconductor laser unit for radiating outgoing light beams of respective different wavelengths, will be confounded on the light incident site to the light splitting means.

This coincidence of the optical axes of the outgoing light beams, radiated from the radiating units 22a, 22b, radiating the outgoing light beams of respective different wavelengths, on the light incident site of the light splitting means, is explained in further detail with reference to FIG. 11.

Figure 3:
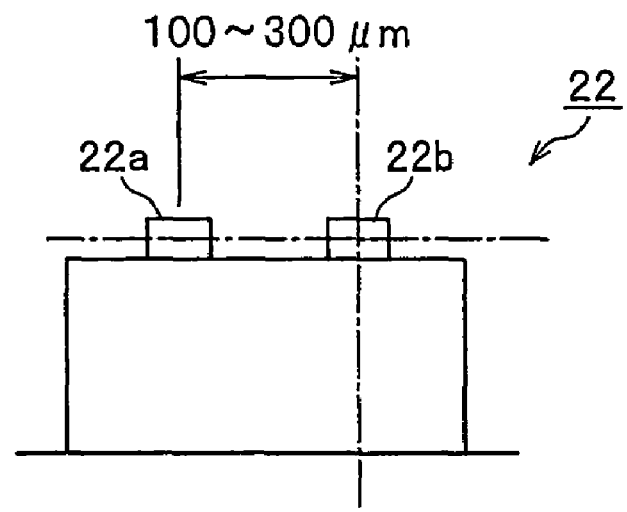
FIG. 3 shows a light source of the optical head of the present invention having plural radiation units radiating plural outgoing light beams of respective different wavelengths.
Figure 11:
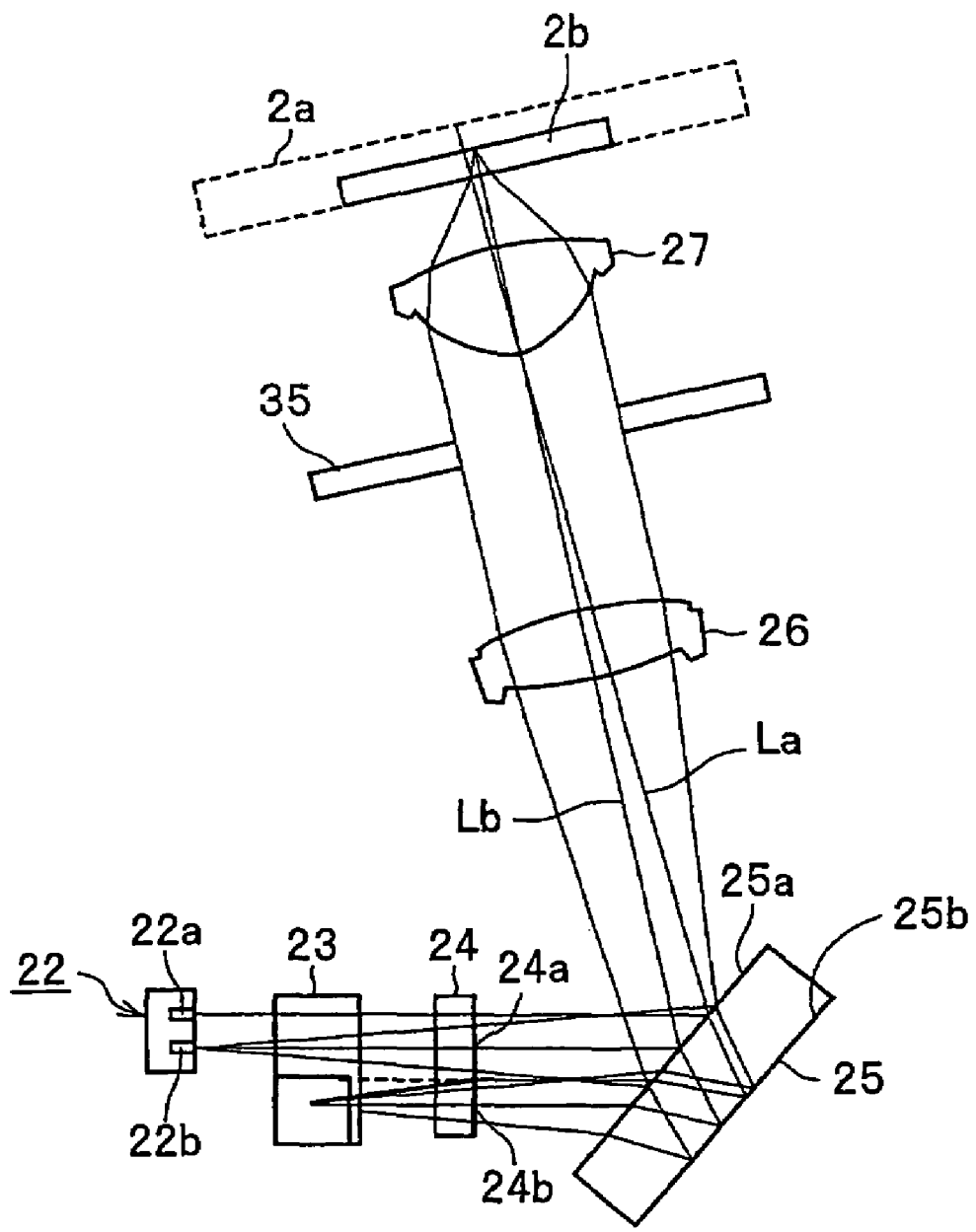
FIG. 11 shows how the optical paths of light beams radiated from plural radiating units radiating outgoing light beams of different wavelengths from the optical head of the present invention are synthesized by an optical path synthesizing diffractive lattice.

That is, the radiating unit 22b is arranged on the optical axis of the objective lens 27, as shown in FIGS. 3 and 11. A light beam Lb for a short wavelength, radiated from the radiating unit 22b, is transmitted along the optical axis of the objective lens 27 and reflected by a disc 2b for a shorter wavelength. The radiating unit 22a, on the other hand, is mounted offset by about 100 to 300 µm from the optical axis. Thus, a laser light beam La for a longer wavelength, radiated from the radiating unit 22a, intersects the laser light beam Lb, radiated from the radiating unit 22b, so as to be reflected by a disc 2a for a longer wavelength.

When incident on the diffraction lattice for optical path synthesis 24b, the laser light beam La for the longer wavelength is separated from the laser light beam Lb for the shorter wavelength. This laser light beam La for the longer wavelength is diffracted by the diffraction lattice for optical path synthesis 24b so that its optical axis is confounded with the optical axis of the laser light beam Lb for the shorter wavelength.

Figure 12:
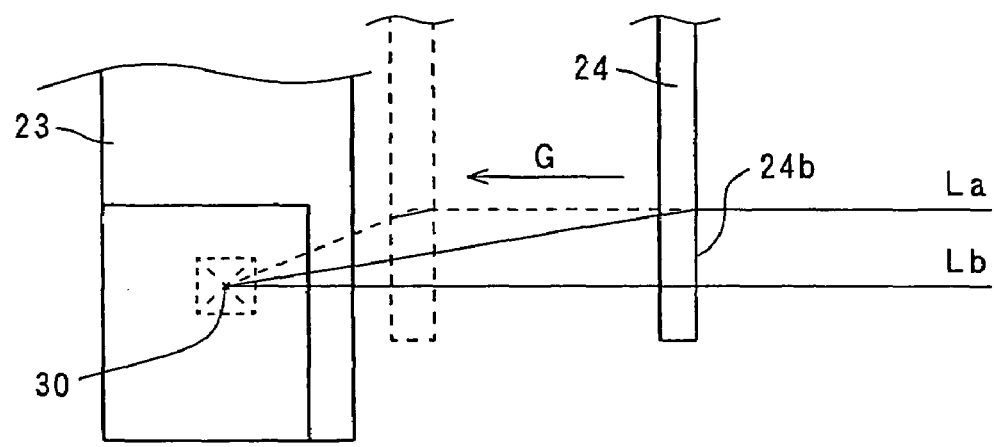
FIG. 12 shows how outgoing light beams of different wavelengths are synthesized by the optical path synthesizing diffractive lattice forming the optical head according to the present invention.

That is, the diffraction lattice for optical path synthesis 24b synthesizes the optical paths of the laser light beams, radiated from the radiating units 22a, 22b, such that, when the laser light beams fall on the splitting prism 30, as later explained, the two laser light beams meet with each other at the apex point of the splitting prism 30, as shown in FIG. 12. At this time, the laser light beam Lb for the shorter wavelength is transmitted through the diffraction lattice for optical path synthesis 24b, as shown in FIG. 12. If the position of the diffraction lattice for optical path synthesis 24b is inadvertently shifted as indicated by an arrow G in FIG. 12, such movement may be coped with by changing the width of the diffraction lattice to change the diffraction angle.

Figure 13A:
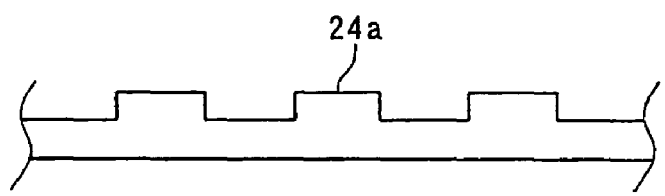
FIG. 13(a) shows the profile of a diffraction lattice for generating three beams forming the optical head according to the present invention.
Figure 13B:
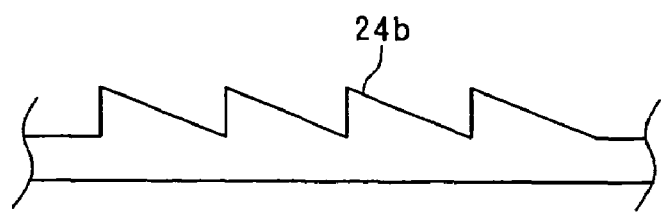
FIG. 13(b) shows the profile of a diffraction lattice for optical path synthesis forming the optical head according to the present invention.

With the diffraction lattice for generating three beams 24a and the diffraction lattice for optical path synthesis 24b, the angle of diffraction is determined by the width of the diffraction lattice, and diffraction occurs in a direction perpendicular to the orientation of the diffraction lattice. For the diffraction lattice for generating three beams 24a, a diffraction lattice symmetrical in the left-right direction, as shown in FIG. 13a, is used. For the diffraction lattice for optical path synthesis 24b, a diffraction lattice non-symmetrical in the left-right direction, as shown in FIG. 13b, or a step-shaped lattice, is used, in order to direct as much light as possible to one side of the lattice.

The reason the radiating unit 22b is arranged on the optical axis is that the wavelength of the laser light beam, radiated from the radiating unit 22b, is shorter than that of the laser light beam, radiated from the radiating unit 22a, so that it is necessary to assure the high accuracy in light condensation on the double wavelength objective lens 27. By arranging the radiating unit 22b on the optical axis, optimum error signals may be produced without requiring high position accuracy.

The return light, re-incident on the composite optical component 23, is reflected by a mirror surface 23a so as to be incident on the splitting prism 30, as shown in FIGS. 4 and 6. The mirror surface 23a may be used as a total reflection surface, with the angle of incidence of the return light being not less than the critical angle of reflection.

The splitting prism 30 is substantially in the form of a square-shaped pyramid, and is arranged so that the center of the main beam falls on the apex point thereof in the vicinity of the focal point of the main beam. Of the return light, incident on the splitting prism 30, the main beam, incident on the apex point or its vicinity, is refracted in different directions, by respective four sides, excluding the bottom surface, of the square-shaped pyramid, and is thereby split into four light beams. These light beams then are incident on light-receiving areas A to D of the photodetector for the main beam 31, placed directly below the composite optical component 23.

Figure 14A:
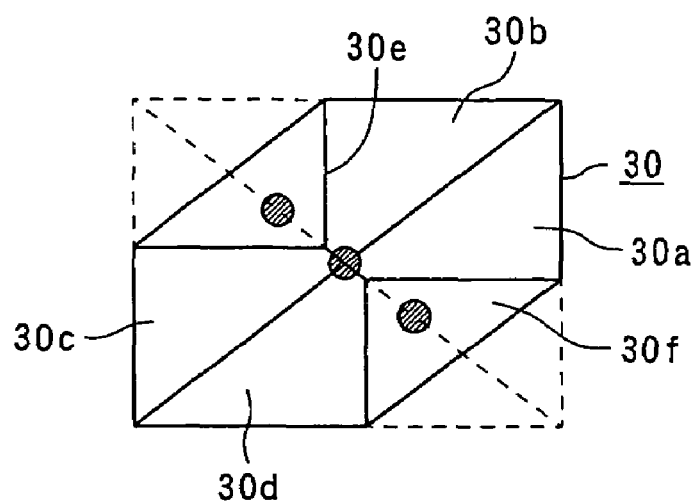
FIG. 14(a) is a plan view showing the state in which inclined surfaces for side beams are provided to a splitting prism forming the optical head according to the present invention.
Figure 14B:
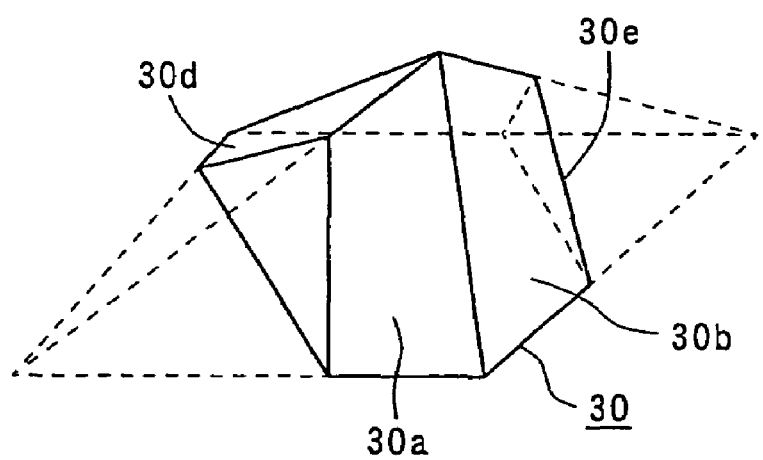
FIG. 14(b) is a perspective view showing the state in which inclined surfaces for side beams are provided to the splitting prism forming the optical head according to the present invention.

It is noted that two of the four ridges of the square-shaped pyramid of the splitting prism 30, lying opposite to each other, may be scraped off partway to form inclined surfaces 30e, 30f for side beams, as shown in FIGS. 14(a) and 14(b). The two side beams, falling on these inclined surfaces 30e, 30f, are transmitted through the splitting prism 30 to fall on the photodetectors for side beams 32, 33.

Thus, the laser light radiated from the light source 22 is transmitted through the same optical component on the ongoing optical path until the laser light radiated from the light source 22 is reflected by the optical disc 2 and on the return optical path until the laser light reflected by the optical disc falls on the light receiving unit. That is, the light beam, radiated from the light source 22, traverses the same composite optical component 23 on the ongoing optical path and the return optical path.

Figure 15:
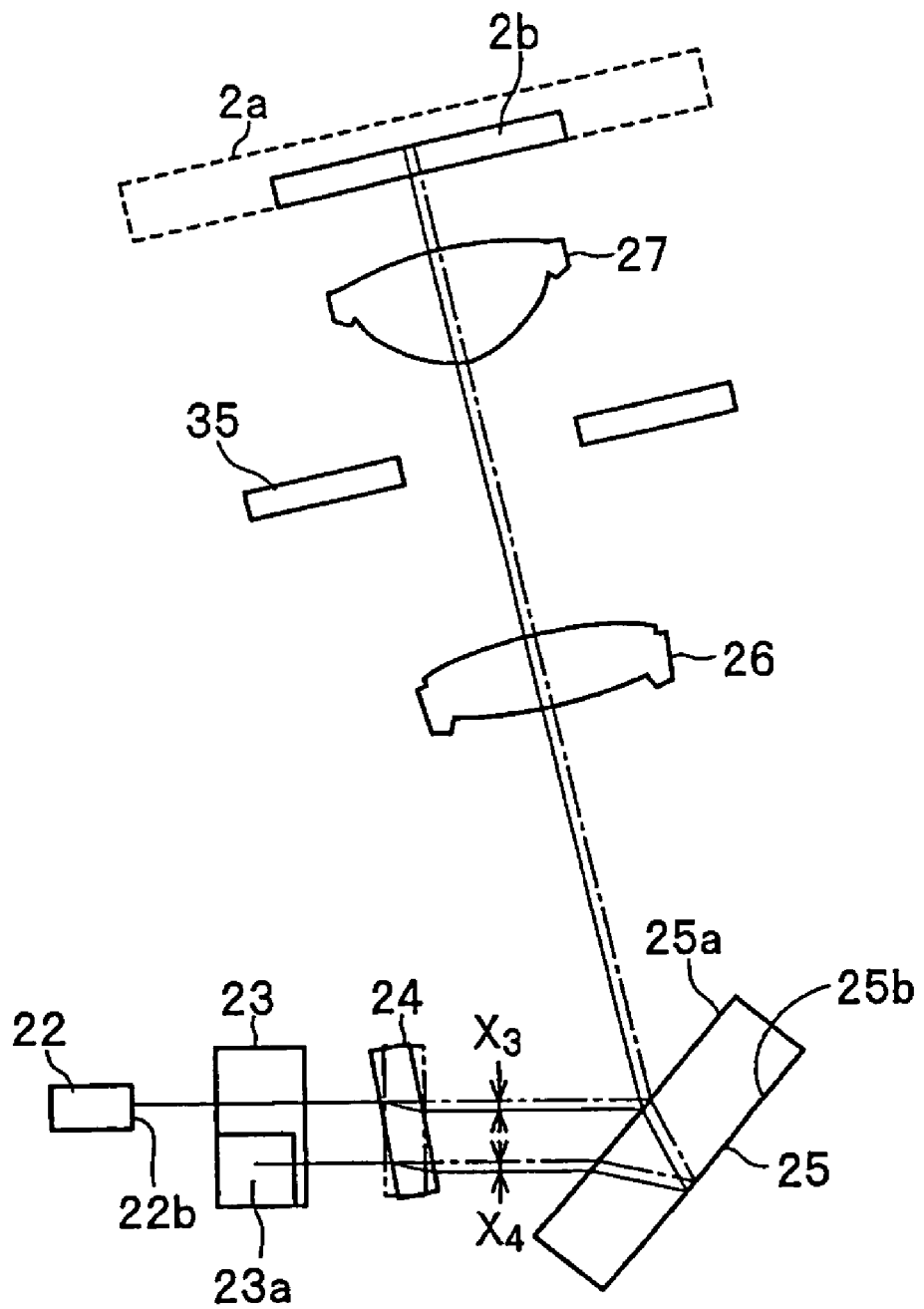
FIG. 15 shows an optical path when an optical component forming the optical head according to the present invention is tilted.

Thus, if a given optical component is tilted, as shown in FIG. 15, a deviation X3 generated when the light beam traverses the optical component on its ongoing optical path is canceled out by a deviation X4 generated when the light beam traverses the optical component on its return optical path. The result is that, even if an optical component, provided partway, is tilted, there is produced no deviation as the optical head. Although only the deviation for the radiating unit 22b for short wavelength has now been explained, similar deviation in the optical path by an optional optical component, provided partway, may be eliminated for the laser light radiated from the radiating unit 22a for the long wavelength.

In the present embodiment, the diffraction lattice for generating three beams 24a and the diffraction lattice for optical path synthesis 24b are provided as the same plate-shaped optical component 24, these may be formed as separate optical components by exploiting the following measures:

That is, the laser light beam, transmitted through the diffraction lattice for generating three beams on the ongoing optical path, is transmitted on the return light path through an area other than an area exhibiting an optical path synthesis effect. In this manner, the laser light, traversing the same optical component, gives optimum focusing and tracking error signals, even in case the optical component is tilted.

The photodetector for the main beam 31 is divided into four equal light receiving areas A to D, and are arranged so that the four main beams, obtained on splitting by the splitting prism 30, are incident on the respective different light receiving areas, as shown in FIG. 9. The two photodetectors for side beams 32, 33 are provided on both sides of the photodetector for the main beam 31 and the two side beams are arranged so as to be incident on the associated light receiving areas after traversing the inclined surfaces 30e, 30f of the splitting prism 30.

Figure 16A:
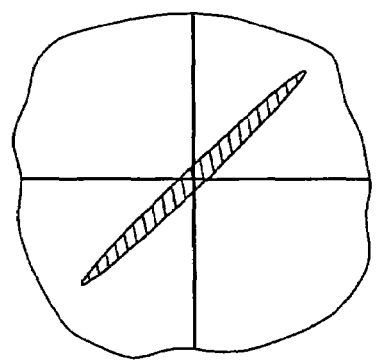
FIG. 16(a) is a plan view showing the state in which a main beam of the return light is incident on light splitting means when the objective lens is at a location closer to the optical disc than the focal position.
Figure 16B:
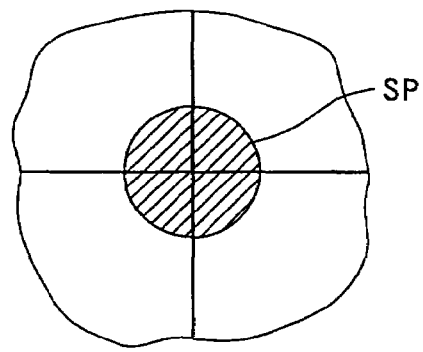
FIG. 16(b) is a plan view showing the state in which the main beam of the return light is incident on light splitting means when the objective lens is at a location corresponding to the focal position with respect to the optical disc.
Figure 17A:
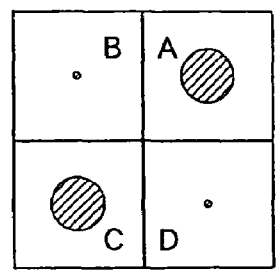
FIG. 17(a) shows the state of four-segment light receiving portions of the photodetector when the objective lens is at a location closer to the focal position with respect to the optical disc.
Figure 17B:
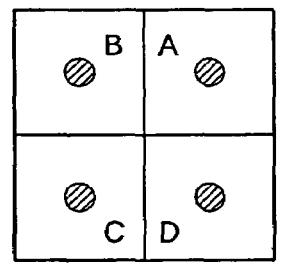
FIG. 17(b) shows the state of four-segment light receiving portions of the photodetector when the objective lens is at a location corresponding to the focal position with respect to the optical disc.

In the optical head, formed by the above-described optical system, and in the recording and/or reproducing apparatus, employing this optical head, the focusing error signal may be obtained as follows:

In case the objective lens 27 is in the regular position, and the light beam, illuminated on the optical disc 2, is in the just-focus state relative to the signal recording surface, the light beam incident on the splitting prism 30 is elliptically-shaped, as shown in FIG. 16(b). The main beam, incident on the splitting prism 30, is divided into four beams so as to be illuminated on the four light receiving areas A to D of the photodetector for the main beam 31, as shown in FIG. 17(b). Since the beam incident on the splitting prism 30 is elliptically-shaped, the light volumes of the four divided beams are substantially equal, such that substantially the same amount of light falls on the each of the four light receiving areas A to D of the photodetector for the main beam 31.

In case the objective lens 27 is too close to the optical disc 2, the focused state is off the just-focus state, such that the incident beam on the splitting prism 30 is elliptically-shaped astride the light receiving areas A and C, as shown in FIG. 16(a), by the astigmatism generated by the return beam traversing the beam splitter 25. When this elliptically-shaped beam is divided into four by the splitting prism, the major portions of the light beam fall on two opposite sides of the prism, so that, as shown in FIG. 17(a), the light volumes falling on the light receiving surfaces A and C of the photodetector 29 are larger, while those falling on the light receiving surfaces B and D of the photodetector 29 are smaller, as shown in FIG. 17(a).

Figure 16C:
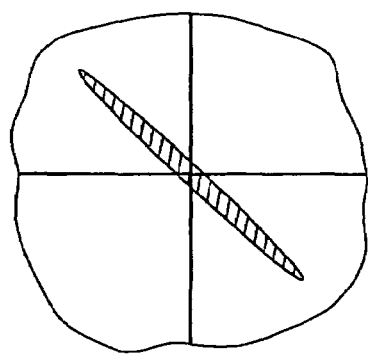
FIG. 16(c) is a plan view showing the state in which the main beam of the return light is incident on light splitting means when the objective lens is at a location remoter than the focal position with respect to the optical disc.
Figure 17C:
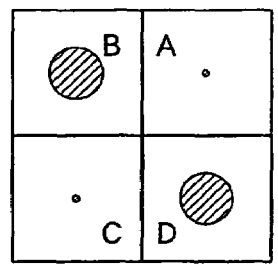
FIG. 17(c) shows the state of four-segment light receiving portions of the photodetector when the objective lens is at a location remoter than the focal position with respect to the optical disc.

In similar manner, in case the objective lens 27 is too remote from the optical disc 2, the beam shape is elliptically-shaped, with the generating line direction inclined 90°, as shown in FIG. 16(c), in the same way as in FIG. 16(a), so that the light volume incident on the light receiving surfaces A and C of the photodetector for the main beam 31 is smaller, while that incident on the light receiving surfaces B and D thereof is larger, as shown in FIG. 17(c).

If the outputs from the four light receiving surfaces A to D of the photodetector for the main beam 31 are denoted SA, SB, SC and SD, respectively, the focusing error signal FE may be obtained by the following equation (1):

$$FE=(SA+SC)-(SB+SD) \quad (1).$$

That is, in FIG. 17(b), FE=0 in case of just-focus. If the objective lens 27 is too close to the optical disc 2, FE is positive in FIG. 17(a) and, if the objective lens 27 is too remote from the optical disc 2, FE is positive in FIG. 17(c). By constructing the focusing servo system, similar in structure to the conventional astigmatic system, the focus position of the objective lens 27 may be controlled appropriately.

The tracking error signal may be obtained by the three-beam method, as conventionally. That is, tracking servo may be applied by receiving the±order one light, split by the diffraction lattice for generating three beams 24a, by the photodetectors for side beams 32, 33, and by detecting the difference of the outputs of the±order one light.

With the optical head 21 according to the present invention, the beam splitter 25, having the half-mirror surface 25a and the mirror surface 25b, collimates the return light, branched in the optical path, so as to be parallel to the outgoing light from the light source, so that optimum focusing error signal may be obtained without being affected by the mounting angle or the thickness of the optical path branching optical component.

With the optical head 21, according to the present invention, in which the light beam is split by e.g. a prism, before the light beam is incident on the photodetector, it is possible to lessen the requirement for position accuracy of the photodetector light receiving surface. That is, if only a proper area is maintained for each of the four light receiving surfaces of the photodetector, it is only required that the four light beams fall on the respective surface, while it does not matter on which location of each surface falls the light beam, so that a high position accuracy is not needed. That is, optimum focusing and tracking error signals may be generated without requiring stringent position accuracy. Thus, it is possible to suppress the production cost of the photodetector and to simplify the photodetector position adjustment in the optical head production process as well as to improve the operational reliability.

Moreover, with the optical head according to the present invention, in which both the light beam of the ongoing optical path and the light beam of the return optical path traverse the same optical component, it is possible to enlarge the gamut of selection of the shape and the production process of the base portion of the optical head, the shape or the arranging method of the other components, so far determined by the stringent position accuracy of the light receiving unit and the light emitting unit. If, due to tilt of an optical component, the ongoing light undergoes optical axis deviation, such deviation is canceled and removed by the return light again traversing the component, so that the relative positions of the light receiving and light emitting units are not changed. The result is that the operational reliability by the accuracy of the components and the degree of freedom in designing may be improved, while the number of the alternative routes of the production method may be increased to suppress the cost of the optical head. Thus, it is possible to provide an optical head and a recording and/or reproducing apparatus employing the optical head which are low in cost and high in operational reliability.

Moreover, with the recording and/or reproducing apparatus, according to the present invention, in which light splitting means of the optical head splits the light beam by light splitting means, before the light beam is incident on the photodetector, it is possible to lessen the requirement for position accuracy of the light receiving surfaces of the photodetector to improve the operational reliability to render it possible to execute the recording and/or reproducing operation appropriately.

The light source of the optical head 21 used is a double wavelength semiconductor laser unit having two radiating units radiating the laser light beams with a wavelength on the order of 780 nm and a wavelength on the order of 650 nm. This, however, is merely illustrative, and the light source may be provided with a radiating unit radiating the laser light beam with a wavelength on the order of 405 nm and with a radiating unit radiating the laser light beam with a wavelength on the order of 780 or 650 nm.

A three wavelength type semiconductor laser unit, provided with radiating units radiating the laser light beam with the wavelengths on the order of 780 nm, 650 nm and 405 nm, may also be used. Meanwhile, when the three wavelength type semiconductor laser unit is used, a wavelength dependent liquid crystal device is removably mounted between the beam splitter and the objective lens. With the optical head, provided with the three wavelength type semiconductor laser unit and with the wavelength dependent liquid crystal device, it is possible to carry out optimum recording and/or reproduction of the optical disc in keeping with the three different wavelengths.

In this above-described optical head 21, the plate-shaped optical component 24 is provided between the composite optical component 23 and the beam splitter 25. Alternatively, the plate-shaped optical component 24 may be provided between the beam splitter 25 and the objective lens 27.

In the optical head 21, the composite optical component 23 and the plate-shaped optical component 24 are provided as discrete components. Alternatively, the composite optical component and the plate-shaped optical component may be formed as one with each other.

An optical head 42, in which the composite optical component 23 and the plate-shaped optical component 24 are formed as one with each other, is hereinafter explained. In the following explanation, common reference numerals are used to depict the parts of components similar to those of the above-described optical head 21, and the detailed description therefor is omitted for simplicity.

Figure 18:
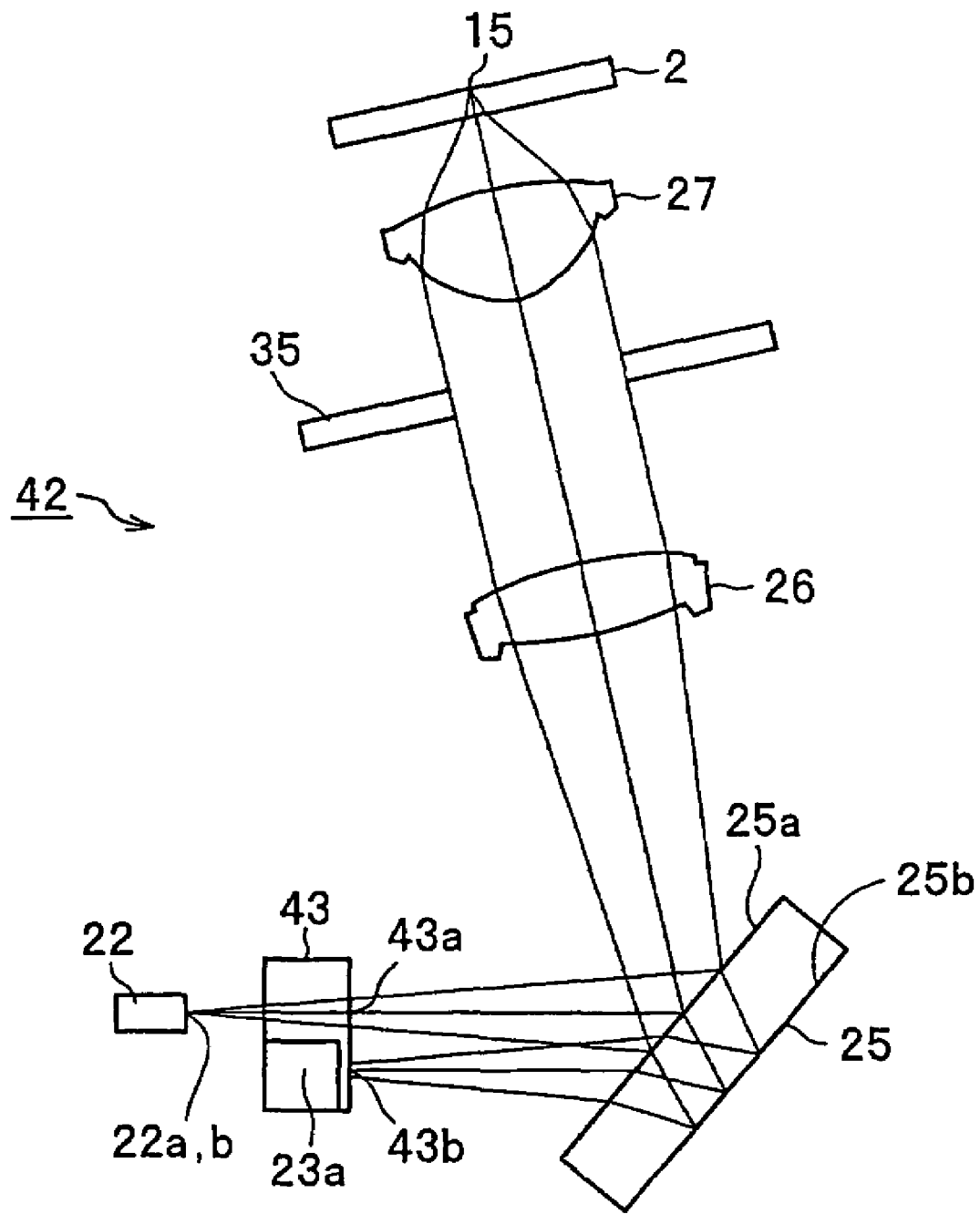
FIG. 18 shows schematics of a further illustrative optical system of the optical head according to the present invention.

Referring to FIG. 18, the optical head 42, according to the present invention, includes a light source 22, an objective lens 27, as a light condensing optical component for condensing the light radiated from the light source 22 on the optical disc 2, a beam splitter 25, as an optical path branching optical component, a composite optical component 43 and a light receiving unit 29.

Similarly to the composite optical component 23, the composite optical component 43 includes a mirror surface 23*a*, as reflecting means provided on a light source side at an incident position of the return light, and a splitting prism 30 provided at an incident position of the return light reflected by the mirror surface 23*a*.

The composite optical component 43 also includes a diffraction lattice for generating three beams 43*a* for diffracting the light beam incident on the ongoing optical path side for splitting the light beam into plural light beams. This diffraction lattice for generating three beams 43*a* splits the incident light beam into three beams, namely an order zero light beam and±order one light beams. A tracking error signal may be obtained from plural light beams obtained on splitting by the diffraction lattice for generating three beams 43*a*.

The composite optical component 43 includes, on its return optical path side, a diffraction lattice for optical path synthesis 43*b* for diffracting the incident light beam for diffracting a light beam of a specified wavelength. This diffraction lattice for optical path synthesis 43*b* is able to diffract the laser light beams, radiated from the radiating units 22*a*, 22*b*, provided in proximity to each other, into meeting with each other at the same location of the splitting prism 30. The respective optical paths of the laser light beams, diffracted by the diffraction lattice for optical path synthesis 43*b*, are synthesized and confounded on the same site. This diffraction lattice for optical path synthesis 43*b* transmits the laser light beam of the wavelength of, for example, 650 nm, while diffracting the laser light beam of the wavelength of 780 nm, such that the optical path of the laser light beam of the wavelength of 780 nm is confounded with the optical path of the laser light beam of the wavelength of 650 nm. In this manner, the diffraction lattice for optical path synthesis 43*b* is able to illuminate the laser light beams, emanating from different radiating units, on to the apex point of the splitting prism 30.

The composite optical component 43 is formed by injection molding a resin material. The material making up the composite optical component 43 is not limited to the resin material and may also be a transparent optical material, such as vitreous material. The composition of the material may also be partially changed by different combinations of the optical materials.

In the above embodiment, the diffraction lattice for optical path synthesis is provided on the return light path side of the composite optical component 43. Alternatively, the diffraction lattice for optical path synthesis may be provided on the return optical path side.

The diffraction lattice for optical path synthesis, provided on the ongoing optical path, is able to synthesize the respective optical paths of the outgoing light beams, radiated from plural radiating units and diffract the light beams into coincidence with the optical axis of the objective lens 27. The outgoing light beams, radiated from the plural radiating units and diffracted by the diffraction lattice for optical path synthesis, are on the same optical path on the optical axis of the objective lens 27, and hence may be incident on approximately the same site of the splitting prism 30.

The optical path of the laser light, radiated from the light source 22, in the optical head 42, is hereinafter explained.

Referring to FIG. 18, the light beams, emanated from the radiating units 22*a*, 22*b* of the light source 22, are split into three beams, namely an order zero light beam (referred to below as a main beam) and±order one light beams (referred to below as side beams), by the diffraction lattice for generating three beams 43*a* of the composite optical component 43. The main and side beams are reflected by the half-mirror surface 25*a* of the beam splitter 25. The light transmitted through the half-mirror surface 25*a* does not affect subsequent process steps. The light beams, reflected by the half-mirror surface 25*a*, are collimated by the collimator lens 26, so as to be condensed by the objective lens 27 on the recording surface 15 of the optical disc 2.

The light condensed on the optical disc 2 is reflected by the optical disc 2. The main and side beams, collectively termed the return light, are transmitted through the objective lens 27 and the collimator lens 26 so as to be reincident on the beam splitter 25. The return light, incident on the beam splitter 25, is transmitted through the half-mirror surface 25*a*, reflected by the mirror surface 25*b* and again transmitted through and radiated from the half-mirror surface 25*a*. The light reflected by the half-mirror surface 25*a* when the return light is introduced into or exits from the beam splitter 25 does not affect subsequent process steps. The return light, radiated from the beam splitter 25, is parallel to the outgoing light radiated from the light source to fall on the beam splitter 25.

Thus, the return light from the optical disc 2 is reflected by the mirror surface 25*b* on the opposite side of the half-mirror surface 25*a* so as to be reradiated from the half-mirror surface 25a. The return light is now parallel to the outgoing light from the light source 22, without dependency upon the thickness error or the mounting angle of the beam splitter 25.

The return light transmitted through and radiated from the half-mirror surface 25a is separated from the optical path of the light radiated from the light source 22 and is reincident on the composite optical component 43. The return light is diffracted in the diffraction lattice for optical path synthesis 43b, in such a manner that the optical axes of the outgoing light of a longer wavelength and the outgoing light of a shorter wavelength, radiated from the radiating units 22a, 22b, provided to the double wavelength semiconductor laser unit in proximity to each other for radiating the outgoing light beams of different wavelengths, will be confounded at the light incident location to the light splitting means.

The laser light beams, the optical paths of which have been confounded on the diffraction lattice for optical path synthesis 43b, are reflected by the mirror surface 23a to fall on the splitting prism 30. The mirror surface 23a may be used as a total reflection surface, with the angle of incidence of the return light being not less than the critical angle of reflection.

The splitting prism 30 is substantially in the form of a square-shaped pyramid, and is arranged so that the center of the main beam falls on the apex point thereof in the vicinity of the focal point of the main beam, as shown in FIGS. 7 and 8. Of the return light, incident on the splitting prism 30, the main beam, incident on the apex point or its vicinity, is refracted in different directions, by respective four sides, excluding the bottom surface, of the square-shaped pyramid, and is thereby split into four light beams, which then are incident on light-receiving areas A to D of the photodetector for the main beam 31, placed directly below the composite optical component 23.

It is noted that two of the four ridges of the square-shaped pyramid may be scraped off partway to form inclined surfaces 30e, 30f for side beams, as shown in FIGS. 14(a), 14(b). The two side beams, falling on these inclined surfaces 30e, 30f, are transmitted through the splitting prism 30 to fall on the photodetectors for side beams 32, 33.

In this manner, both the laser light on its ongoing optical path, radiated from the light source 22 and reflected by the optical disc 2, and the laser light on its return optical path, reflected by the optical disc to fall on the light receiving unit, are transmitted through the same optical component. That is, the light beam radiated from the light source 22 is transmitted through the composite optical component 23 so that the light on the ongoing optical path and light on the return optical path traverse the same optical component.

Thus, if a given optical component is tilted, a deviation generated when the light beam traverses the optical component on its ongoing optical path is canceled out by a deviation generated when the light beam traverses the optical component on its return optical path, as in the case of the optical head 21 described above. Thus, with the laser light beam, transmitted through the same optical component on its ongoing optical path and return optical path, optimum focusing and tracking error signals may be obtained even in case a given optical component is tilted.

The photodetector for the main beam 31 is divided into the four equal light receiving areas A to D, and are arranged so that the four main beams, obtained on splitting by the splitting prism 30, are incident on the respective different light receiving areas, as shown in FIG. 9. The two photodetectors for side beams 32, 33 are provided on both sides of the photodetector for the main beam 31 and the two side beams are arranged so that the two side beams are incident on the associated light receiving areas after traversing the splitting prism 30.

In the optical head 42, constructed by the above-described optical system, the method for calculating the focusing error signals and the tracking error signals is the same as in the optical head 21 described above and hence the explanation therefor is omitted for simplicity. The focusing position can be optimally controlled by the so produced focusing error signals, while tracking servo may be applied based on the tracking error signals.

The optical head 42, constructed as described above, may also be used for a recording and/or reproducing apparatus, as is the optical head 21 shown in FIG. 1.

With the optical head 42, according to the present invention, return light beams, the optical path of which has been branched by the beam splitter 25, provided with the half-mirror surface 25a and the mirror surface 25b, is collimated and rendered parallel to the outgoing light from the light source, so that optimum focusing and tracking error signals may be obtained without being affected by the thickness or the mounting angle of the optical path branching optical component.

With the optical head, according to the present invention, in which the light beam is split by e.g. a prism before falling on the photodetector, it is possible to lessen the requirement for position accuracy of the light receiving surface of the photodetector. That is, if only a proper area is maintained for each of the four light receiving surfaces of the photodetector, it is only required that the four light beams fall on the respective surfaces, while it does not matter on which location of each surface falls the light beam, so that a high position accuracy is not a requirement. That is, optimum focusing and tracking error signals may be generated without requiring stringent position accuracy. Thus, it is possible to suppress the production cost of the photodetector and to simplify the photodetector position adjustment in the optical head production process as well as to improve the operational reliability.

Moreover, with the optical head according to the present invention, in which both the light beam of the ongoing optical path and the light beam of the return optical path traverse the same optical component, it is possible to enlarge the gamut of selection of the shape and the production process of the base portion of the optical head, the shape or the arranging method of the other components, so far determined by the stringent position accuracy of the light receiving unit and the light emitting unit. If, due to tilt of an optical component, the ongoing light undergoes optical axis deviation, such deviation is canceled and removed by the return light again traversing the component, so that the relative positions of the light receiving and light emitting units are not changed. The result is that the operational reliability by the accuracy of the components and the degree of freedom in designing may be improved, while the number of the alternative routes of the production method may be increased to suppress the cost of the optical head. Thus, it is possible to provide an optical head of low cost and high reliability and a recording and/or reproducing apparatus employing the optical head.

Meanwhile, in the optical head 21 and the optical head 42, a portion of the outgoing light, transmitted through the beam splitter, is detected by a monitor photodetector, and control is exercised to render the output of the double wavelength semiconductor laser unit constant through an APC (automatic power control circuit). However, as an alternative, it is possible for the composite optical component to separate the light beam for control, from the signal light beam, and to route the light beam for control to the light receiving monitor element.

An optical head 60, designed to separate radiated light into a light beam for control and a signal light beam for signaling, and to route the light beam for control to the light receiving monitor element, is hereinafter explained. In the following explanation, common reference numerals are used to depict parts or components common to the optical head 21 and detailed description is omitted for simplicity.

Figure 19:
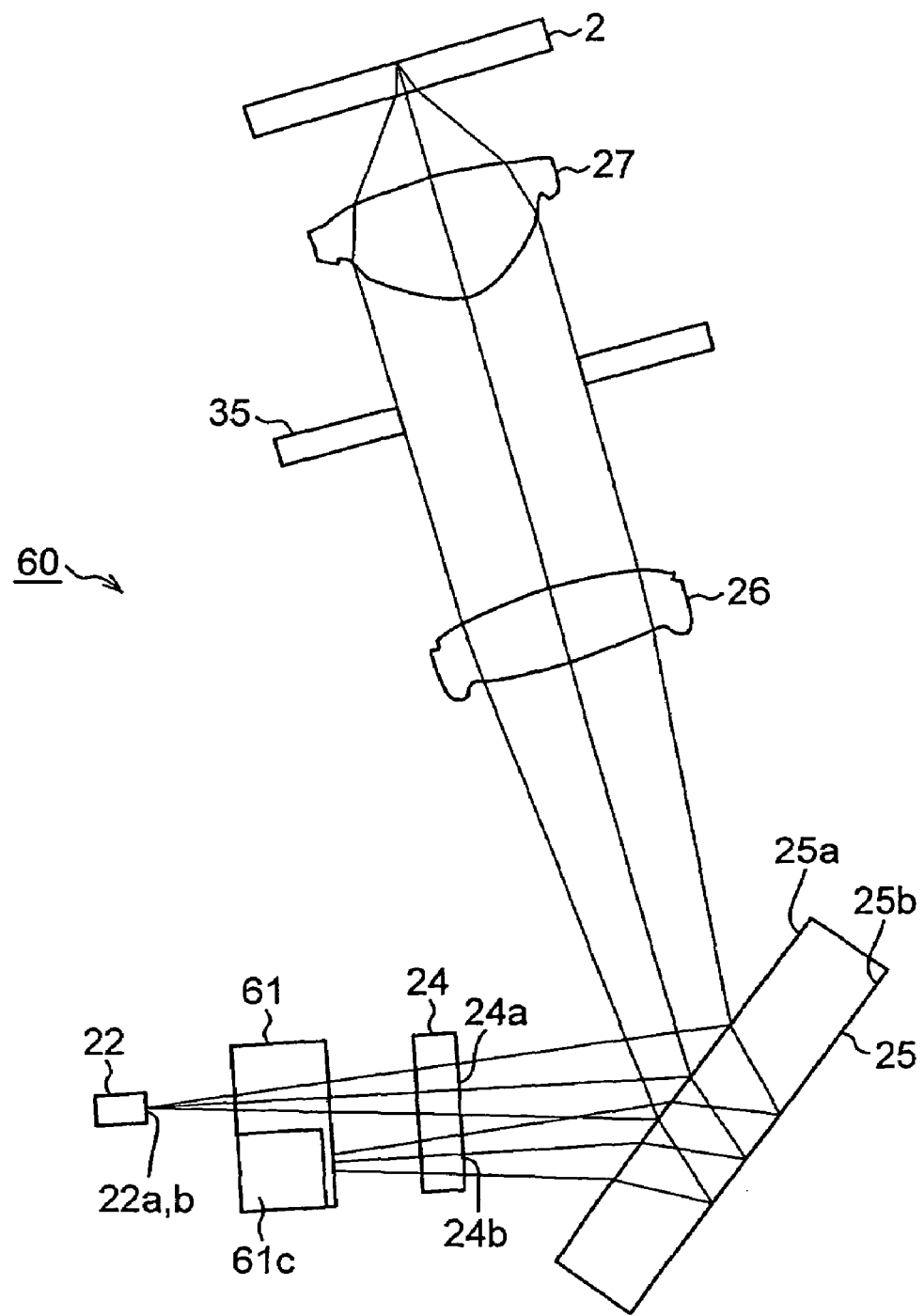
FIG. 19 shows schematics of a still further illustrative optical system of the optical head according to the present invention.

The optical head 60 according to the present invention includes a light source 22, an objective lens 27, as a light condensing optical component for condensing the outgoing light, radiated from the light source 22 on the optical disc 22, a beam splitter 25, as an optical path branching optical component, a composite optical component 61 and a light receiving unit 62, as shown in FIG. 19.

The light receiving unit 62 is made up by a light receiving surface for signaling 62a, for receiving the return light condensed on and reflected back from the optical disc 2, and a monitor light receiving surface 62b for monitoring the output of light radiated from the light source 22.

A collimator lens 26 for collimating the light transmitted therethrough is provided between the beam splitter 25 and the objective lens 27. An aperture stop 35 for restricting the laser light transmitted through the collimator lens 26 to a preset numerical aperture NA is provided between the collimator lens 26 and the objective lens 27.

Figure 20:
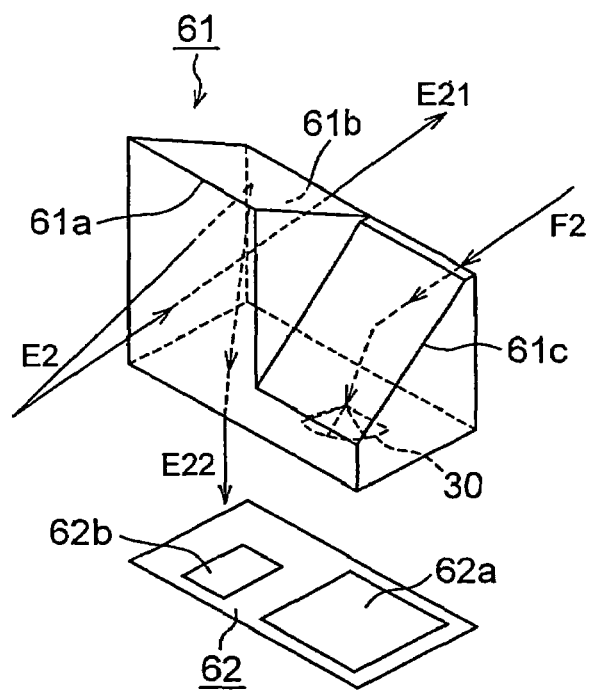
FIG. 20 is a perspective view of a composite optical component forming the optical head shown in FIG. 19.
Figure 21:
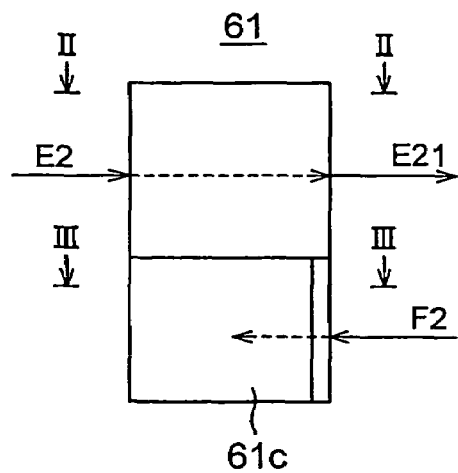
FIG. 21 is a plan view of a composite optical component forming the optical head shown in FIG. 19.
Figure 22:
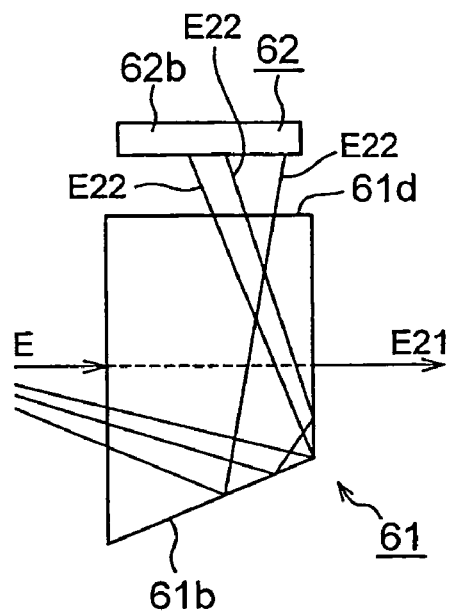
FIG. 22 is a cross-sectional view, taken along line II-II, showing the composite optical component shown in FIG. 21.
Figure 23:
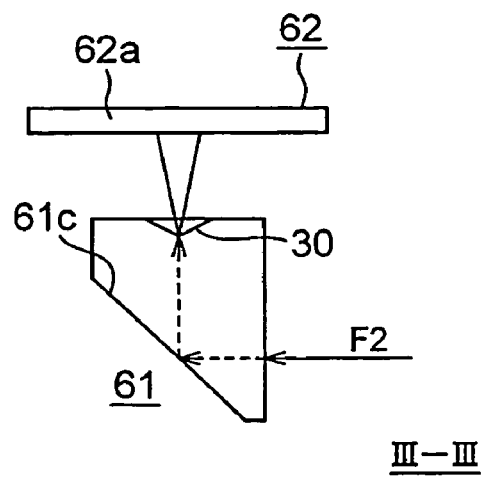
FIG. 23 is a cross-sectional view, taken along line III-III, showing the composite optical component shown in FIG. 21.

The composite optical component 61 is provided on an optical path between the light source 22 and the beam splitter 25, as shown in FIG. 19. The composite optical component 61 includes, on an ongoing optical path side, on which falls an outgoing light beam E2, a control light routing means for separating the outgoing light beam from the light source 22 into a light beam for signaling E21, condensed on the optical disc, and a light beam for control E22 for monitoring the light output, as shown in FIGS. 20 to 22. The control light routing means for the composite optical component 61 is made up by a component 61a for transmitting the light for signaling, which is the light radiated from the light source 22 and condensed on the optical disc, and a first mirror surface 61b, as a control light routing means for separating the control light beam from the light beam for signaling, which is the light radiated from the light source 22 and transmitted through the component 61a. The composite optical component 61 also includes, on its return light path side, where the return light F2 from the optical disc is incident, a second mirror surface 61c, as a reflecting means provided on a light source side where the return light is incident, and a beam splitting prism 30, as a light splitting means, provided at a location where the return light reflected by the second mirror surface 61c is incident, as shown in FIG. 23.

The first mirror surface 61b of the composite optical component 61 is arranged at an angle relative to the optical axis of the signal light beam, transmitted through the component 61a, and separates the control light beam from the signal light beam of the outgoing light by internal reflection. The control light beam, thus separated, is transmitted through a light transmitting surface 61d so as to be radiated to the monitor light receiving component 61. Meanwhile, the control light beam, reflected by the first mirror surface 61b, may be directly transmitted through the light transmitting surface 61d to fall on the monitor light receiving component 61, or transmitted after internal reflection through the light transmitting surface 61d to fall on the monitor light receiving component 61.

This first mirror surface 61b is designed to reflect the control light beam by 100% reflection. This first mirror surface 61b may, for example, be formed by a reflective film. The light transmitting surface 61d, may be in a lenticular form for condensing the outgoing control light beam on the monitor light receiving component 61.

The composite optical component 61 is formed by injection molding a resin material. The material of the composite optical component 61 is, however, not limited to the resin and may also be a light-transmitting optical material, such as vitreous material. The material composition may also be partially changed by suitable combination of these optical materials.

A plate-shaped optical component 24 is provided between the composite optical component 61 and the beam splitter 25, as in the case of the optical head 21.

The optical path of the laser light beam, radiated from the light source 22 in this optical head 60, is hereinafter explained.

Referring to FIGS. 20 to 22, the light beam E2, radiated from the radiating units 22a, 22b of the light source 22, is incident on the composite optical component 61 so as to be separated into a signal light beam E21 and a control light beam E22. That is, the major portion of the light beam E2, incident on the composite optical component 61, is directly transmitted by the device 61a as the signal light beam E21 condensed on the optical disc.

A fraction of the light beam E2, incident on the composite optical component 61, is reflected by the first mirror surface 61b and separated from the incident light so as to be radiated from the light transmitting surface 61d to the monitor light receiving component. The control light beam E22 may be reflected by the first mirror surface 61b and directly radiated towards the monitor light receiving component, or may be internally reflected not less than twice by a surface including the first mirror surface 61b so as to be then radiated from the light transmitting surface 61d towards the monitor light receiving component. A fraction of the control light beam may be reflected by the first mirror surface 61b, with the remaining portion of the light beam being internally reflected not less than twice by a surface including the first mirror surface 61b so as to be then radiated towards the monitor light receiving component. This first mirror surface 61b is designed to reflect the control light beam by 100% reflection.

The control light beam E22, separated by the signal light beam, falls on the monitor light receiving surface 62b of the light receiving unit 62. The control light beam is detected by the monitor light receiving surface 62b and the information on the control light beam is sent to an APC (automatic power control) circuit, not shown. On detection of the control light beam, the APC circuit manages control to provide a constant power of the output of the light beam radiated from the light source 22.

The signal light beam, transmitted through the component 61a of the composite optical component 61, is split into three beams, namely an order zero diffracted light beam (referred to below as a main beam) and±one order light beams (referred to below as side beams), by the diffraction lattice for generating three beams 24a of the plate-shaped optical component 24. These three light beams are then reflected on the half-mirror surface 25a of the beam splitter 25. The light transmitted through the half-mirror surface 25a does not affect the subsequent step.

The light beams, reflected by the half-mirror surface 25a, is collimated by the collimator lens 26 and restricted by the aperture stop 35 so as to be condensed by the objective lens 27 on the recording surface 15 of the optical disc 2.

The light condensed on the optical disc 2 is reflected by the optical disc 2. The main and side beams, referred to below collectively as the return signal light, are transmitted through the objective lens 27 and the collimator lens 26 so as to be re-incident on the beam splitter 25. The return signal light, incident on the beam splitter 25, is transmitted through the half-mirror surface 25a and thence radiated to outside. The return signal light, reflected by the half-mirror surface 25a when making entrance/exit via the beam splitter 25, does not affect the subsequent step. The return signal light, radiated from this beam splitter 25, is parallel to light radiated from the light source 22 to fall on the beam splitter 25.

The return light from the optical disc 2 is reflected by the mirror surface 25b, lying on the opposite side to the half-mirror surface 25a, and is again radiated from the half-mirror surface 25a, so that the return light from the optical disc is parallel to the outgoing light from the light source 22, without dependency upon the mounting angle or the thickness error of the beam splitter 25.

The return signal light transmitted through the half-mirror surface 25a and radiated is separated from the optical path of the light radiated from the light source 22, and is re-incident on the plate-shaped optical component 24. The return signal light then is diffracted by the diffraction lattice for optical path synthesis 24b and is radiated therefrom in such a manner that the optical axes of the radiated light with a long wavelength and the radiated light with a short wavelength from the radiating units 22a, 22b will be confounded at the incident point to the light splitting means.

The return signal light, re-incident on the composite optical component 61, is reflected by the second mirror surface 61c to fall on the splitting prism 30, as shown in FIGS. 20 and 23. The mirror surface 61c may be used as a total reflection surface, with the angle of incidence of the return light not less than the critical angle of reflection.

The splitting prism 30 is substantially in the form of a square-shaped pyramid, and is arranged so that the center of the main beam falls on the apex point thereof, in the vicinity of the focal point of the main beam, as shown in FIGS. 7 and 8. Of the return light, incident on the splitting prism 30, the main beam, incident on the apex point or its vicinity, is refracted in different directions, by respective four sides, excluding the bottom surface, of the square-shaped pyramid, and is thereby split into four light beams, which are then incident on light-receiving areas A to D of the photodetector for the main beam 31 of the light receiving surface for signaling 62a of the light receiving unit 62 placed directly below the composite optical component 23.

In this manner, the ongoing optical path of the laser light, radiated from the light source 22 and reflected by the optical disc 2, and the return optical path of the laser light, incident on the light receiving unit, after reflection by the light receiving unit, traverse the same optical component. Stated differently, the light beam, radiated from the light source 22, is transmitted through the composite optical component 23 both in its ongoing optical path and its return optical path.

Thus, if a given optical component is tilted, a deviation generated when the light beam traverses the optical component on its ongoing optical path is canceled out by a deviation generated when the light beam traverses the optical component on its return optical path, as in the case of the optical head 21 described above. Thus, with the laser light beam, transmitted through the same optical component on its ongoing optical path and return optical path, the focusing and tracking error signals, that are optimum even in case a given optical component is tilted, may be produced.

The signal receiving surface 62a of the light receiving unit 62 is made up by the photodetector for the main beam 31 and the photodetectors for side beams 32, 33, as in the case of the optical head, as shown in FIG. 9. The photodetector for the main beam 31 is divided into four equal light receiving areas A to D, and are arranged so that the four main beams, obtained on splitting by the splitting prism 30, are incident on the respective different light receiving areas, as shown in FIG. 9. The two photodetectors for side beams 32, 33 are provided on both sides of the photodetector for the main beam 31 and the two side beams are arranged so as to be incident on the associated light receiving areas after traversing the splitting prism 30.

In the optical head 60, constructed by the above-described optical system, the method for calculating the focusing error signals and the tracking error signals is the same as in the optical head 21 described above, and hence the explanation therefor is omitted for simplicity. The focusing position can be optimally controlled by the so produced focusing error signals, while tracking servo may be applied based on the tracking error signals.

The optical head 60, constructed as described above, may also be used for a recording and/or reproducing apparatus, as is the optical head 21 shown in FIG. 1.

With the optical head 60, according to the present invention, there is no necessity of separately providing the monitor photodetector and the photodetector for signal detection, so that there is no necessity of increasing the number of component parts or the number of production steps otherwise caused by providing individual semiconductor devices having the comparable performance.

With the optical head 60 according to the present invention, the beam splitter 25, having the half-mirror surface 25a and the mirror surface 25b, collimates the return light, branched in the optical path, so as to be parallel to the outgoing light from the light source, so that optimum focusing error signal may be obtained without being affected by the mounting angle or the thickness of the optical path branching optical component.

With the optical head 60, according to the present invention, in which the light beam is split by e.g. a prism, before the light beam is incident on the photodetector, it is possible to lessen the requirement for position accuracy of the photodetector light receiving surface. That is, if only a proper area is maintained for each of the four light receiving photodetector surfaces, it is only required that the four light beams fall on the respective surfaces, while it does not matter on which location of each surface falls the light beam, so that a high position accuracy is not needed. That is, optimum focusing and tracking error signals may be generated without requiring stringent position accuracy, so that it is possible to suppress the production cost of the photodetector and to simplify the photodetector position adjustment in the optical head production process as well as to improve the operational reliability.

Moreover, with the optical head 60 according to the present invention, and the recording and/or reproducing apparatus, in which both the light beam of the ongoing optical path and the light beam of the return optical path traverse the same optical component, it is possible to enlarge the gamut of selection of the shape and the production process of the base portion of the optical head, the shape or the arranging method of the other components, so far determined by the stringent position accuracy of the light receiving unit and the light emitting unit. If, due to tilt of an optical component, the ongoing light undergoes optical axis deviation, such deviation is canceled and removed by the return light again traversing the component, so that the relative positions of the light receiving and light emitting units are not changed. The result is that the operational reliability by the accuracy of the components and the degree of freedom in designing may be improved, while the number of the alternative routes of the production method may be increased to suppress the cost of the optical head. Hence, it is possible to provide an optical head of low cost and high reliability and a recording and/or reproducing apparatus employing the optical head.

In the above-described optical head 60, the plate-shaped optical component 24 is provided between the composite optical component 61 and the beam splitter 25. However, the plate-shaped optical component 24 may also be provided between the beam splitter 25 and the objective lens 27.

Meanwhile, in the optical heads 21, 42, the light splitting means splits the main beam into four beams. Alternatively, the light splitting means may also split the side beams.

An optical head 80, in which light splitting means splits the main and side beams, is now explained. In the following explanation, the parts or components common to those of the above-described optical head 21 are not explained and are indicated by common reference numerals.

Figure 24:
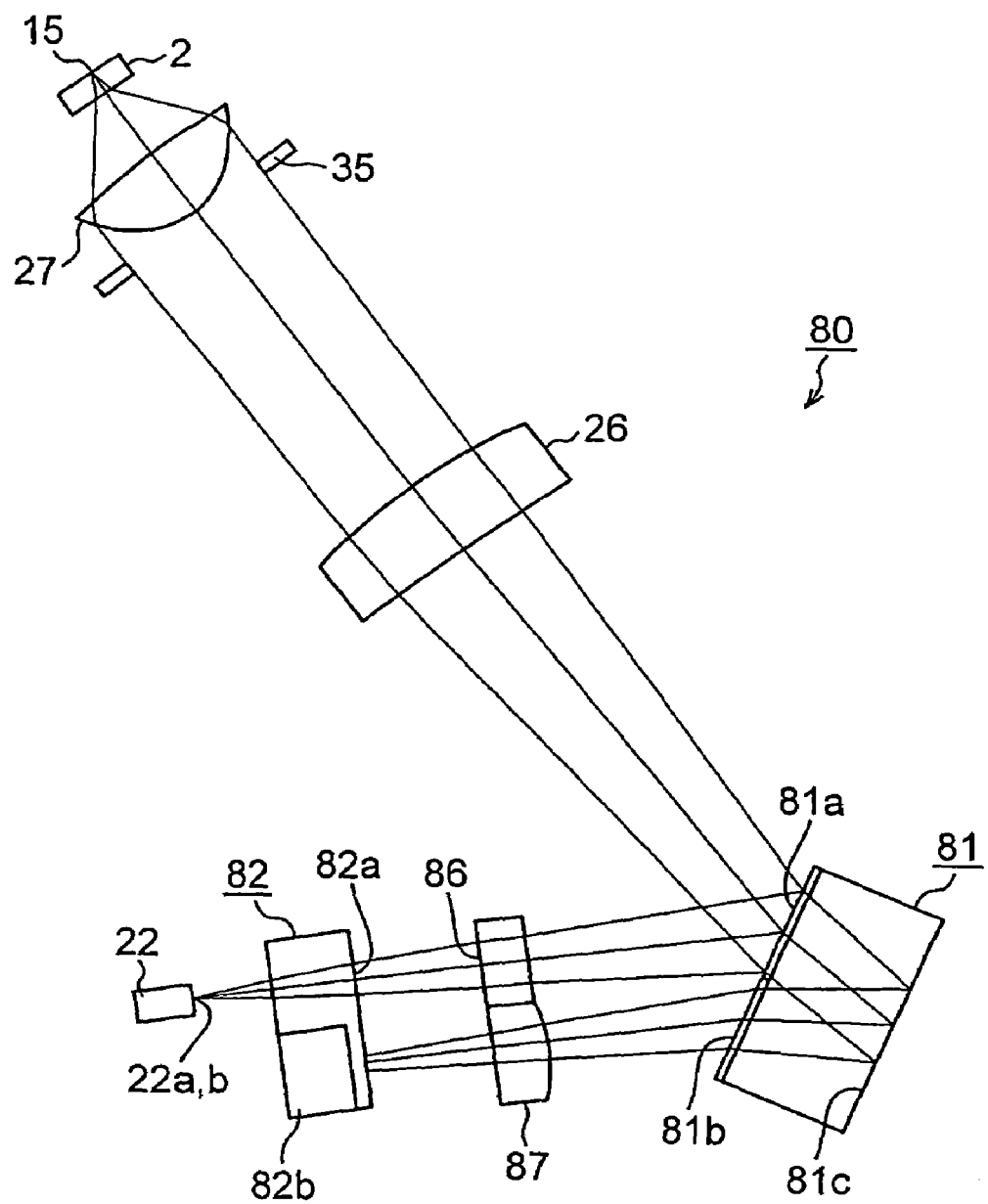
FIG. 24 shows schematics of a still further illustrative optical system of the optical head according to the present invention.

Referring to FIG. 24, the optical head 80, according to the present invention, includes a light source 22, an objective lens 27, as an optical light condensing device for condensing the light radiated from the light source 22, a beam splitter 81, as an optical path branching device, a composite optical component 82, having light splitting means, a diffraction lattice 86 for generating three beams, and a light receiving unit 84.

A collimator lens 26 for collimating the light, transmitted therethrough, is provided between the beam splitter 81 and the objective lens 27. An aperture stop 35 for restricting the laser light beam, transmitted through the collimator lens 26, to a preset numerical aperture NA, is provided between the collimator lens 26 and the objective lens 27.

The beam splitter 81, as the optical path branching device, is made up by a half-mirror surface, having reflective areas of different values of reflectance and which is formed on a side thereof facing the light source 22, and a mirror surface 81c, formed on a side thereof remote from the light source 22. The half-mirror surface, having reflective areas of different values of reflectance, includes a first half-mirror unit 81a, formed on an area illuminated by the ongoing light, radiated from the light source 22, and a second half-mirror unit 81b, formed in an area illuminated by the light which is the return light reflected by the optical disc, transmitted through the first half-mirror unit 81a and which is reflected by the mirror surface 81c. The first half-mirror unit 81a reflects approximately 80% and transmits approximately 16% of the incident light, while the second half-mirror unit 81b reflects approximately 0.5% and transmits approximately 99% of the incident light. The beam splitter 81 is provided between the light source 22 and the objective lens 27, as shown in FIG. 24, and has an angle and a thickness determined so that the ongoing light and the return light are not overlapped with each other on the half-mirror surface having reflective areas exhibiting the different reflectance values.

Figure 25:
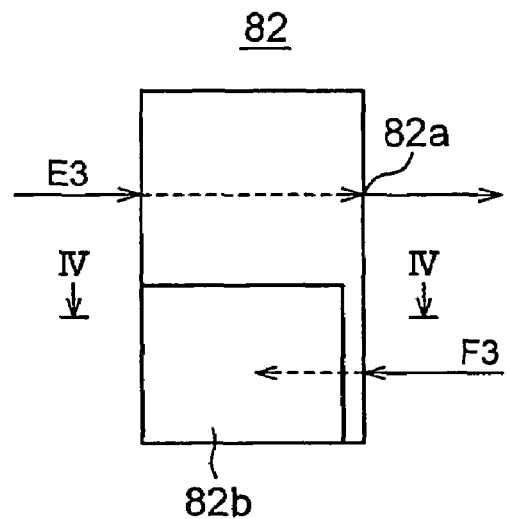
FIG. 25 is a plan view of the composite optical component forming the optical head shown in FIG. 24.
Figure 26:
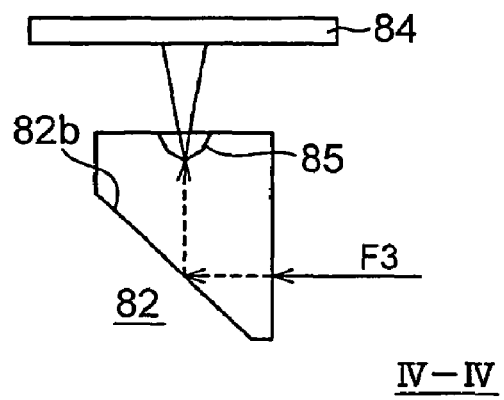
FIG. 26 is a cross-sectional view, taken along line IV-IV, showing the composite optical component shown in FIG. 25.

The composite optical component 82 is provided on an optical path between the light source 22 and the beam splitter 81, as shown in FIG. 24. The composite optical component 82 includes, on an ongoing optical path side, illuminated by an outgoing light beam E3, a diffraction lattice for optical path synthesis 82a, having a function similar to that of the diffraction lattice for optical path synthesis 24b. The composite optical component also includes a mirror surface 82b, as a reflecting means, on the light source side, in an area where a return light beam reflected by the optical disc 2 is incident, and a splitting prism 85, as a light splitting means, provided at a location where the return light beam F3, reflected by this mirror surface 82b, is incident, as shown in FIGS. 25 and 26.

The composite optical component 82 is formed by injection molding a resin material. Meanwhile, the material that makes up the composite optical component 82 is not limited to the resin material and may also be a transparent optical material, such as vitreous material. The composition of the material may also be changed by using two or more of the above-mentioned optical materials in combination.

Figure 27A:
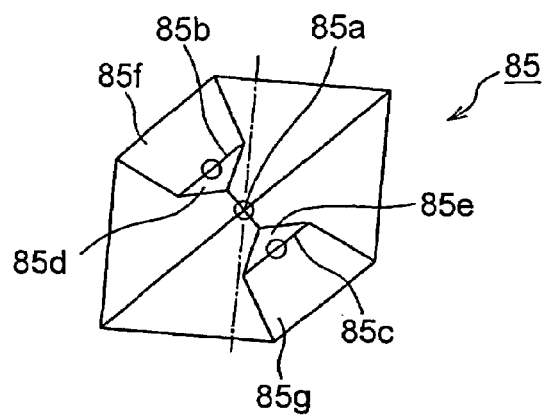
FIG. 27(a) is a plan view of a splitting prism forming the optical head shown in FIG. 24.
Figure 27B:
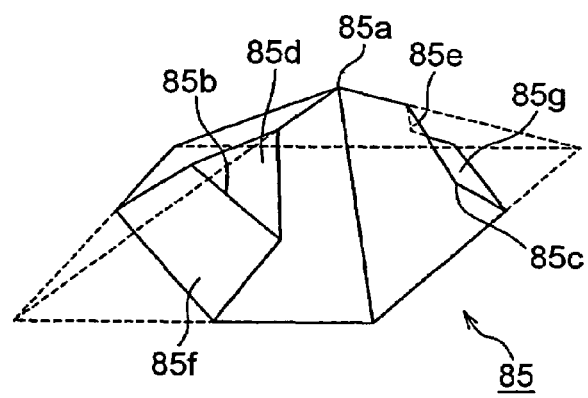
FIG. 27(b) is a perspective view of the splitting prism forming the optical head shown in FIG. 24.

Referring to FIG. 27, the splitting prism 85 is made up by a first splitting portion 85a and second splitting units 85b, 85c. The first splitting portion 85a is arranged in the vicinity of the focal point of the return light from the optical disc 2 of the main beam, which is the order zero light diffracted by the diffraction lattice for generating three beams 86. The second splitting units 85b, 85c are arranged in the vicinity of the focal point of the return light from the optical disc 2 of the two side beams which are the±order one light beams diffracted by the diffraction lattice for generating three beams 86.

In the splitting prism 85, shown in FIG. 27, two facing ones of four ridge lines of a substantially square pyramid are cut partway, while being cut from the substantially square bottom side, to form first inclined surfaces 85d, 85e for the side beams and second inclined surfaces 85f, 85g for the side beams. The first splitting portion 85a is an apex point in case the square shape of the square-shaped pyramid is the bottom surface, while the second splitting units 85b, 85c are boundary lines between the first inclined surfaces 85d, 85e and the second inclined surfaces 85f, 85g.

Figure 28:
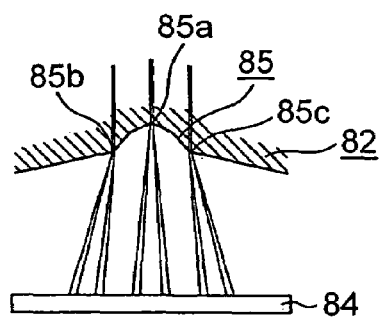
FIG. 28 is a cross-sectional view for illustrating the splitting of return light by first and second splitting units of the splitting prism shown in FIG. 27.

The first splitting portion 85a of the splitting prism 85 is arranged at a focal point position of the return light of the main beam, incident on the splitting prism 85, for spatially splitting the return light of the main beam into four beams, as shown in FIG. 28. The second splitting units 85b, 85c are arranged at the focal point positions of the return light beams of the side beams for spatially splitting the return light beams of the side beams into respective two portions, as shown in FIG. 28.

The diffraction lattice for generating three beams 86 is provided on an optical component, arranged on an ongoing optical path between the composite optical component 82 and the beam splitter 81, and diffracts the incident light beam to split the beam into three light beams, namely an order zero light beam and±order one light beams. By this diffraction lattice for generating three beams 86, tracking error signals may be obtained from the split plural light beams. On the return side optical path between the composite optical component 82 and the beam splitter 81, there is provided an aberration correction lens 87, operating as an aberration correction means for correcting the respective aberrations of the light beams incident on the return path side thereof. The aberration correction lens 87 corrects the respective aberrations generated on the return path light as the return light from the optical disc.

Figure 29:
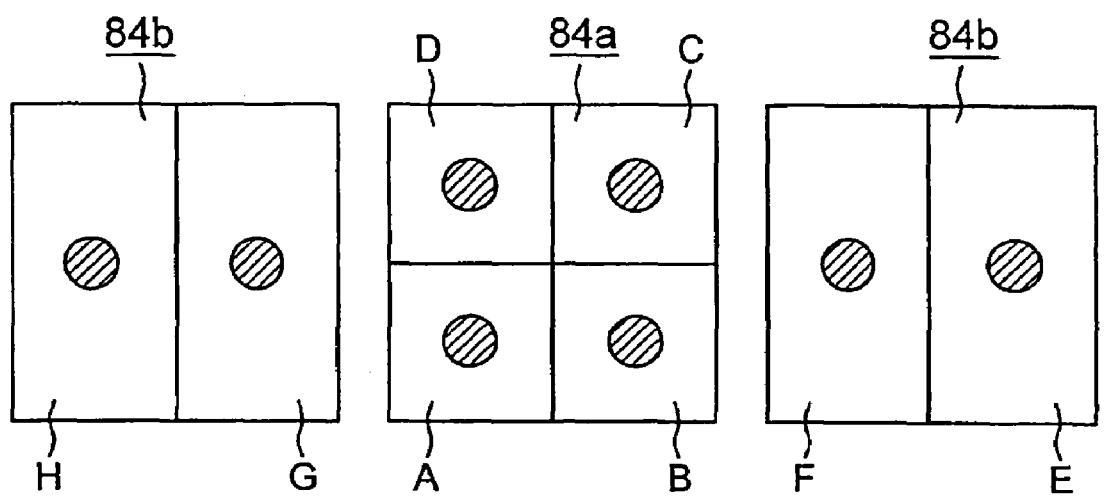
FIG. 29 shows a photodetector for a main beam and photodetectors for side beams forming the optical head shown in FIG. 24.
Figure 30:
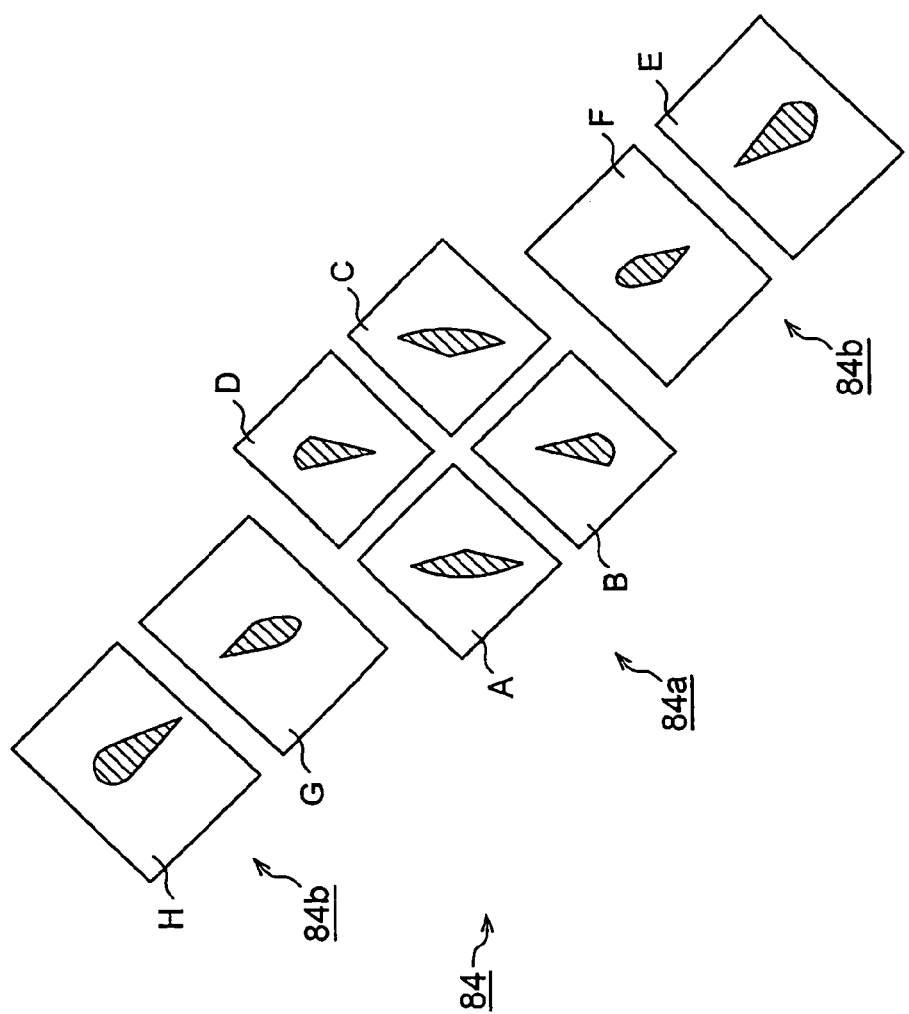
FIG. 30 is a plan view for illustrating the state in which the return light is incident on the photodetector for a main beam and the photodetectors for side beams forming the optical head shown in FIG. 24.

The light receiving unit 84 is made up by a first light receiving unit 84a and a second light receiving unit 84b, as shown in FIG. 29. The first light receiving unit 84a is a photodetector for the main beam, and includes plural light receiving areas for receiving plural return light beams spatially split by the first splitting portion 85a of the splitting prism 85. The photodetector includes light receiving areas A to D, obtained on splitting into four equal portions by a pair of splitting lines extending at right angles to each other, as shown in FIGS. 29 and 30.

The second light receiving unit 84b of the light receiving unit 84 are photodetectors for the two side beams, as±order one light beams, of the plural light beams diffracted by the diffraction lattice for generating three beams 86, and each include plural light receiving areas for receiving the return light beams spatially split by the second splitting portions 85b, 85c of the splitting prism 85. Referring to FIGS. 29 and 30, these photodetectors are arranged facing each other, with the first light receiving unit 84a in-between, and each include light receiving areas E, F and G, H, divided by respective splitting lines.

The optical path of the laser light, radiated from the light source 22 in the present optical head 80, is hereinafter explained.

Referring to FIG. 24, the light beams of different wavelengths, radiated from the radiating units 22a, 22b of the light source 22, provided in proximity to the double-wavelength semiconductor laser unit, fall on the composite optical component 82, so as to be radiated after refraction by the diffraction lattice for optical path synthesis 82a, in such a manner that the optical axes of the outgoing light beam of the long wavelength and the outgoing light beam of the short wavelength, radiated from the radiating units 22a, 22b will be confounded on the light incident site on the splitting prism 85.

The light beam is radiated from the diffraction lattice for optical path synthesis 82a, after splitting into three beams, namely an order zero diffracted light beam, referred to below as a main beam, and±order one diffracted light beam, referred to below as side beams, by the diffraction lattice for generating three beams 86, and is reflected by the first half-mirror unit 81a of the half mirror surface of the beam splitter 81. Since the first half-mirror unit 81a has a reflectance of approximately 80%, the light beam, radiated from the light source 22, is able to reach the optical disc 2 without losing its power. The light transmitted through the half-mirror surface does not affect the subsequent process.

The light beam reflected by the first half-mirror unit 81a of the beam splitter 81 is collimated by the collimator lens 26 and restricted by the aperture stop 35 so as to be condensed by the objective lens 27 on the recording surface 15 of the optical disc 2.

The light condensed on the optical disc 2, is reflected thereby, and the main and side beams, referred to below collectively as the return light, are transmitted through the objective lens 27 and the collimator lens 26 so as to be re-incident on the beam splitter 81. The return light, incident on the beam splitter 81, is transmitted through the first half-mirror unit 81a, reflected by the mirror surface 81c and radiated after transmission through the second half-mirror unit 81b. The return light, reflected by the first half-mirror unit 81a and the second half-mirror unit 81b of the half-mirror surface when the return light makes entrance to or exits from the beam splitter 81 does not affect the subsequent process. The return light, radiated from the beam splitter 81, is parallel to the outgoing light, which is radiated from the light source 22 to fall on the beam splitter 81.

Thus, the return light from the optical disc 2 is reflected by the mirror surface 81c, opposite to the half-mirror surface, and is re-radiated from the half-mirror surface, so as to be collimated with respect to the light radiated from the light source 22, without dependency on the mounting angle or the error in thickness of the beam splitter.

The return light, transmitted through and radiated from the second half-mirror unit 81b of the beam splitter 81, is separated from the optical path, emanating from the light source 22, to fall on the aberration correction lens 87, where the light is corrected for aberrations and radiated towards the composite optical component 82.

The return light, re-incident on the composite optical component 82, is reflected by the mirror surface 82b to fall on the splitting prism 85, as shown in FIG. 26. The mirror surface 82b may be used as a total reflection surface, with the angle of incidence of the return light being not less than the critical angle of reflection.

The splitting prism 85 is arranged so that the center of the main beam falls on the apex point thereof in the vicinity of the focal point of the main beam as a first splitting portion, as shown in FIG. 28. Of the return light, incident on the splitting prism 85, the main beam, incident on the apex point or its vicinity, is refracted in different directions, by respective four sides of the square-shaped pyramid, delimiting the apex point as the first splitting portion 85a, and is thereby split into four light beams, which then are incident on light-receiving areas A to D of the photodetector for the main beam 84a placed directly below the composite optical component 82.

The respective side beams fall on a boundary line between the first inclined surface and the second inclined surface, as the second splitting portion 85b, and is refracted in different directions by the first and second surfaces, so as to be thereby split into two light beams, which are then incident on the light receiving areas E, F, G and H of the photodetector for side beam 84b, placed directly below the composite optical component 82.

The photodetector for the main beam 84a is divided into four portions, that is, four light receiving areas A, B, C and D, and is arranged so that four main beams, obtained by the splitting prism 85, will be incident on respective different light receiving areas, as shown in FIGS. 29 and 30

The two photodetectors for side beam 84b are provided, with the photodetector for the main beam 84a in-between, and are each split into the light receiving areas E, F and G, H, which are arranged so that two side beams, obtained by the second splitting portion 85b of the splitting prism, are incident on respective different light receiving areas.

In the optical head 80, formed by the above-described optical system, as in the optical head 21, described above, and in the recording and/or reproducing apparatus, exploiting the optical head, the focusing error signals are obtained as follows: If the outputs from the four light receiving surfaces A to D of the photodetector for the main beam 84a are denoted SA, SB, SC and SD, respectively, the focusing error signal FE may be obtained by the following equation (2):

$$FE=(SA+SC)-(SB+SD) \qquad (2).$$

The tracking error signals may be obtained by the differential push-pull method, referred to below as the DPP method, as follows. The DPP method is such a system in which the laser light radiated from the semiconductor laser unit as a light source is split into three beams, by a diffractive lattice arranged on an optical path between the light source and the disc, and in which the reflected three light beams are received by the respective photodetectors to produce tracking error signals.

These photodetectors are of light receiving patterns shown in FIG. 29 in which the eight light beams as split are incident on the respective light receiving areas. At this time, the respective light receiving areas are each of a sufficient surface measure as compared to the incident beam spot.

The beam spot of the order zero diffracted light in the diffraction lattice for generating three beams 86 is received by the light receiving areas A to D of the light receiving unit 84. The beam spot of the±order one diffracted light in the diffraction lattice for generating three beams 86 is arranged to fall on the light receiving areas E, F and H, G of the light receiving unit 84, respectively.

The three beam spots, diffracted by the diffraction lattice for generating three beams 86, traverse the tracks on the disc signal surface and thereby undergo changes in the strength of the reflected light. These beam spots are received on a light receiving pattern and subjected to calculations to produce push-pull signals. That is, with the main beam push-pull signal MPP and with the side beam push-pull signals SPP, MPP and SPP are given by the following equations (3) and (4):

$$MPP=(SA+SD)-(SB+SC) \quad (3)$$

$$SPP=(SF-SE)+(SH-SG) \quad (4)$$

where SE, SF, SG and SH are outputs from the light receiving areas E, F, G and H of the photodetectors for side beam 84b, respectively.

It is noted that the array of three beam spots on the disc signal surface is set so that the phase difference between MPP and SPP relative to the tangential direction of the track is equal to just 180°, and that the tracking error signal may be detected by performing the calculations on the MPP and SPP in accordance with the following equation:

$$TE=MPP-k \times SPP \quad (5)$$

where TE is the tracking error and k is a constant determined for the particular optical disc system.

In the optical head 80, the focusing position can be optimally controlled by the focusing error signal obtained and tracking servo can be applied by the so produced tracking error signals.

In the optical head 80 according to the present invention, the splitting prism 85 is responsible for the beam splitting function for producing the push-pull signals for the main and side beams, and hence the requirement for position accuracy of the photodetector relative to the incident beam position can be lessened. That is, if only a proper area is maintained for each of the four light receiving surfaces of the photodetector for the main beam and each of the two light receiving surfaces of the photodetector for the side beams, it is only required that the main and side beams fall on the respective surfaces of the first and second splitting units, while it does not matter on which location of each surface falls the light beam, so that a high position accuracy is not required. That is, optimum focusing and tracking error signals may be generated without requiring stringent position accuracy. Thus, it is possible to moderate the requirement for position accuracy of the beam splitting lines of the photodetectors to suppress the production cost of the photodetectors and to simplify the photodetector position adjustment in the optical head production process, thereby improving the operational reliability.

With the optical head 80 according to the present invention, the beam splitter 81, having the first half-mirror unit 81a, second half-mirror unit 81b and the mirror surface 81c collimate the return light, branched in the optical path thereof, so as to be parallel to the outgoing light from the light source, so that optimum focusing error signals may be obtained without being affected by the mounting angle or the thickness of the optical path branching optical components.

Moreover, with the recording and/or reproducing apparatus, according to the present invention, in which the light splitting means of the optical head splits the light beam before the light beam falls on the photodetector, so that the requirement for position accuracy of the light receiving surface of the photodetector can be lessened to improve the operational reliability, and hence the recording and/or reproducing operation can be carried out satisfactorily.

Although the diffraction lattice for generating three beams 86 and the aberration correction lens 87 are here mounted discretely, these may be mounted unitarily. That is, such a plate-shaped optical component, having a diffraction lattice for generating three beams and an aberration correction lens on the ongoing path side and on the return path side, respectively, may be provided between the composite optical component 82 and the beam splitter 81.

With the optical head, having this plate-shaped optical component, the laser light radiated from the light source 22 traverses the same optical component on its ongoing optical path from the light source 22 to the optical disc 2, where the laser light is reflected, and on its return optical path from the optical disc 2 where the laser light is reflected to the light receiving unit where the light is received. Thus, if a given optical component is tilted, a deviation generated when the light beam traverses the optical component on its ongoing optical path is canceled out by a deviation generated when the light beam traverses the optical component on its return optical path, as in the case of the optical head 21 described above. Thus, with the laser light beam, transmitted through the same optical component on its ongoing optical path and return optical path, optimum focusing and tracking error signals may be produced, even in case a given optical component is tilted.

With the optical head, having this plate-shaped optical component, in which both the ongoing light and the return light traverse the same optical component, it is possible to enlarge the gamut of selection of the shape and the production process of the base portion of the optical head, the shape or the arranging method of the other components, so far determined by the stringent position accuracy of the light receiving unit and the light emitting unit. If, due to tilt of an optical component, the ongoing light undergoes optical axis deviation, such deviation is canceled and removed by the return light again traversing the component, so that the relative positions of the light receiving and light emitting units are not changed. The result is that the operational reliability by the accuracy of the components and the degree of freedom in designing may be improved, while the number of the alternative routes of the production method may be increased to suppress the cost of the optical head. As a result, it is possible to provide an optical head of low cost and high operational reliability and a recording and/or reproducing apparatus employing the optical head.

The diffraction lattice for generating three beams 86 and the aberration correction lens 87 are mounted between the composite optical component 82 and the beam splitter 81. However, the diffraction lattice for generating three beams 86 and the aberration correction lens 87 may also be mounted between the beam splitter 81 and the objective lens 27.

Figure 31A:
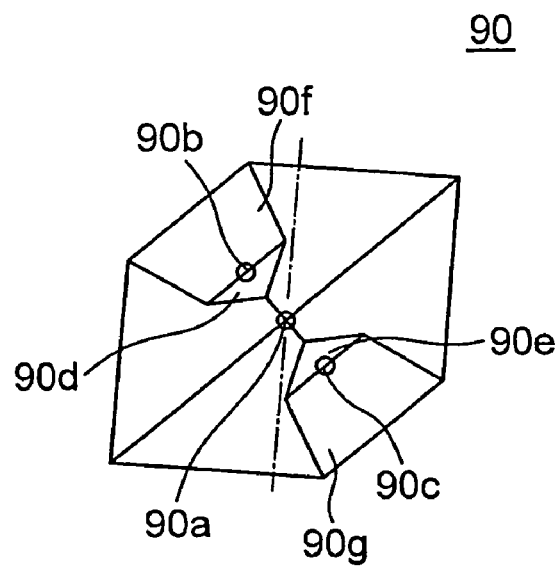
FIG. 31(a) is a plan view showing a further illustrative splitting prism forming the optical head shown in FIG. 24.
Figure 31B:
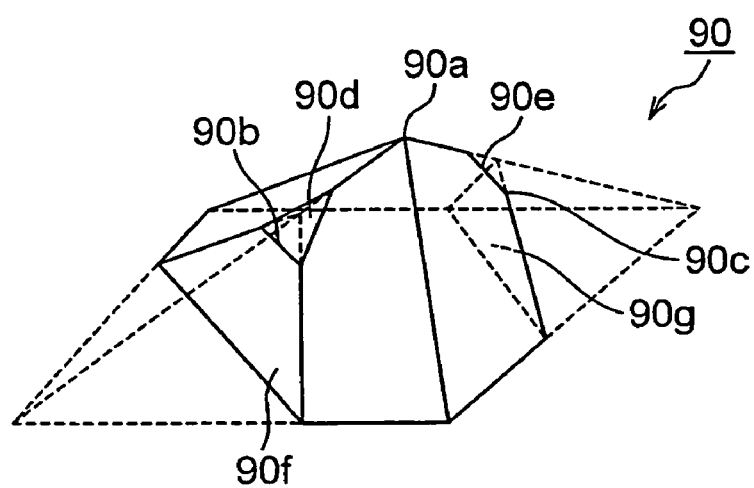
FIG. 31(b) is a perspective view showing the further illustrative splitting prism forming the optical head shown in FIG. 24.

Meanwhile, the light splitting means used is the splitting prism 85 in which the first and second inclined surfaces, delimiting the second beam splitting portions, are recessed, as shown in FIG. 27. However, a splitting prism 90, in which the first and second inclined surfaces, delimiting the second beam splitting portions, are convexed, as shown in FIG. 31, my be used. With the splitting prism 90, shown in FIG. 31, two of the four ridges of the square-shaped pyramid are scraped off partway to form a first inclined surface, while two ridge lines are cut off to form an apex point which apex point is then scraped off to from a second inclined surface. The first splitting portion 90a is an apex point of the square-shaped pyramid when the square-shaped surface is the bottom of the pyramid, while the second splitting portions 90b, 90c represent boundary lines between the first inclined surfaces 90d, 90e and the second inclined surfaces 90f, 90g.

Meanwhile, the beam splitting surfaces, formed in the splitting prism, may also be a so-called free curved surface array, instead of a combination of planar surfaces, as described above. The free curved surface array is formed by plural curved surfaces. In case the respective surfaces are curved, the respective beams, as split, may be radiated in preset directions, such that it is possible to produce the favorable effect as that achieved with the aforementioned splitting prism 85.

Although the splitting prism in used in the foregoing as light splitting means, beam splitting may also be achieved using the hologram. In case the hologram is used to effect the beam splitting, the respective beams may be diffracted in preset directions to effect the beam splitting, whereby the favorable effect similar to that in case of providing the splitting prism 85 may be realized.

For beam splitting, combinations of planar surfaces, free curved surfaces and holograms may also be used as light splitting means.

Meanwhile, in the optical heads 21, 42, 60 and 80, light condensing means may be provided between the splitting prism and the light receiving means.

An optical head 120, having light condensing means by means of which the light, diverged when traversing the splitting surface, is condensed on the photodetector, is now explained. In the following explanation, the same reference numerals are used to depict the parts or components common to those used in the optical heads 21 and 80 and detailed description therefor is omitted for simplicity.

Figure 32:
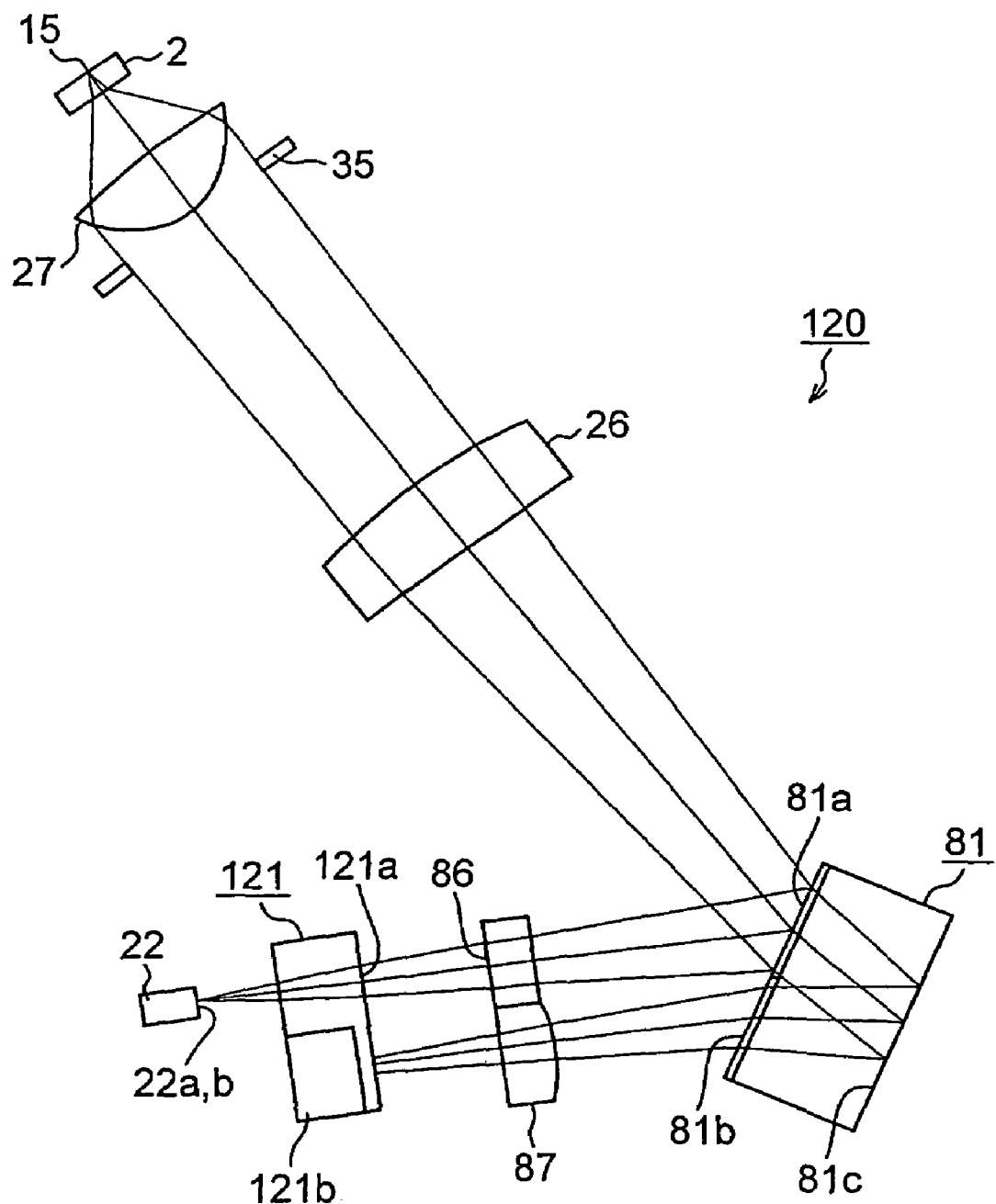
FIG. 32 shows schematics of a further illustrative optical system of the optical head according to the present invention.

Referring to FIG. 32, the optical head 120 according to the present invention includes a light source 22, an objective lens 27, as a light condensing optical component for condensing the outgoing light radiated from this light source 22 to the optical disc 2, a beam splitter 81, as an optical path branching optical component, a composite optical component 121, having light splitting means, a diffraction lattice for generating three beams 86, and a light receiving unit 84.

A collimator lens 26, for collimating the light, transmitted therethrough, is provided between the beam splitter 81 and the objective lens 27. An aperture stop 35 for restricting the laser light beam, transmitted through the collimator lens 26, to a preset numerical aperture NA, is provided between the collimator lens 26 and the objective lens 27.

Figure 33:
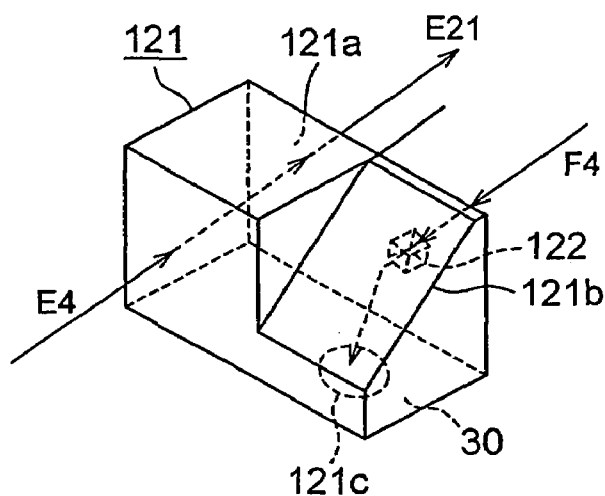
FIG. 33 is a perspective view showing a composite optical component forming an optical head shown in FIG. 32.
Figure 34:
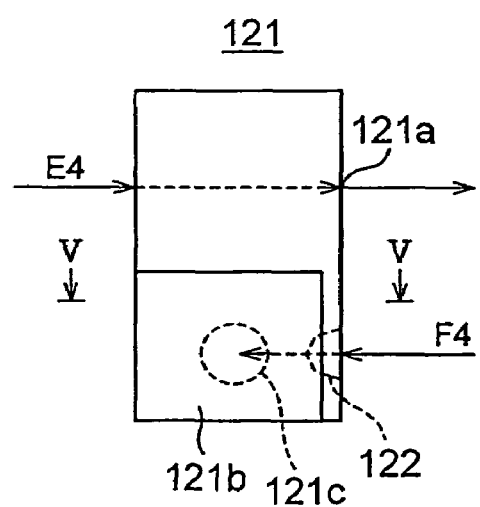
FIG. 34 is a perspective view showing a composite optical component forming the optical head shown in FIG. 32.
Figure 35:
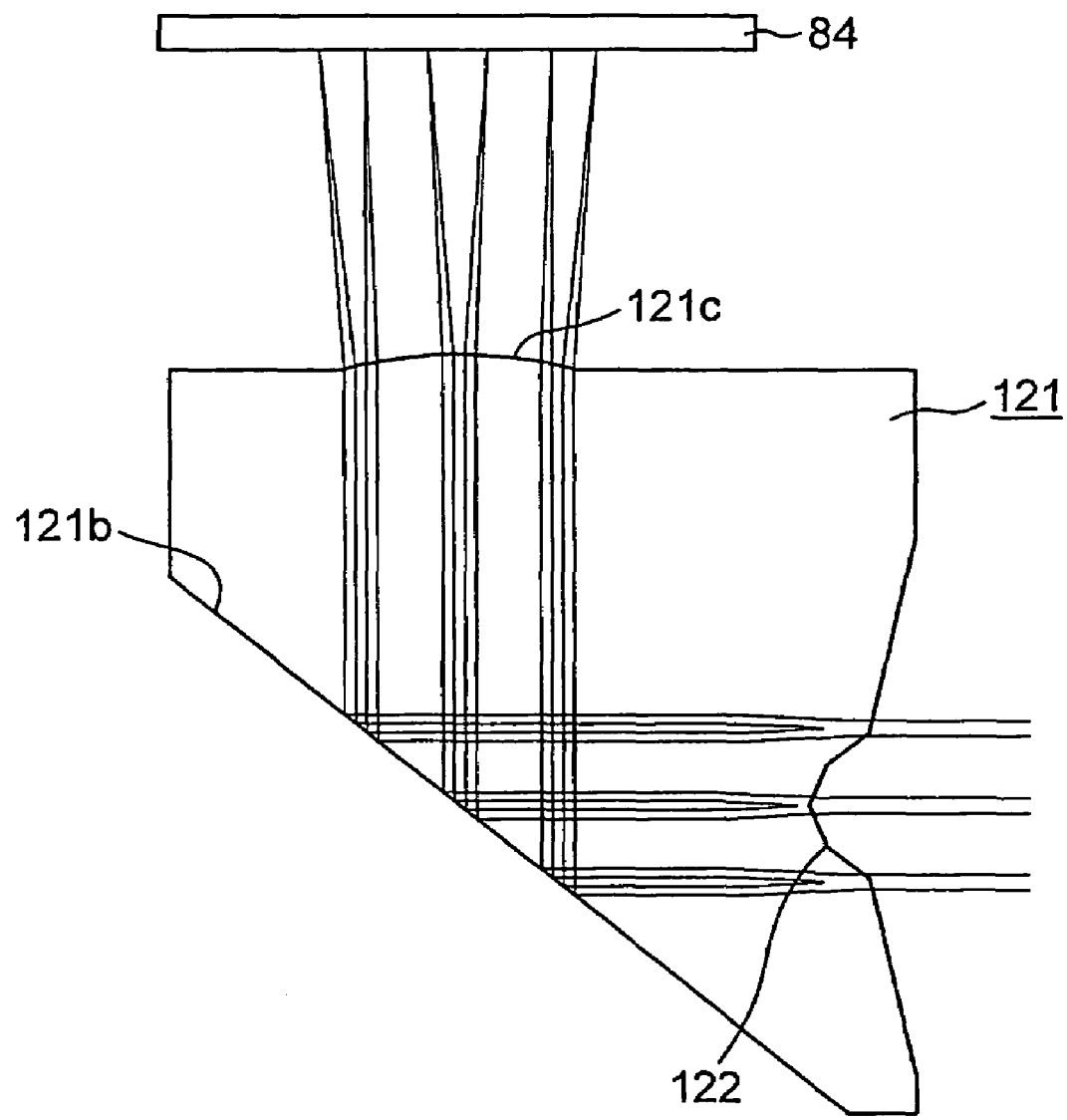
FIG. 35 is a cross-sectional view, taken along line V-V, of the composite optical component shown in FIG. 34.

The composite optical component 121 is provided on an optical path between the light source 22 and the beam splitter 81, as shown in FIG. 32. The composite optical component 121 includes, on its ongoing optical path side, on which falls an outgoing light beam E4, a diffraction lattice for optical path synthesis 121a, having a function similar to that of the diffraction lattice for optical path synthesis 24b, a splitting prism 122, as light splitting means, provided on a light source side location on which falls a return light F4 from the optical disc 2, a mirror surface 121b, as reflecting means for reflecting the light split by this splitting prism 122, and a light condensing optical component 121c, as a light condensing means, provided at a position from which is radiated the return light reflected from the mirror surface 121b, as shown in FIGS. 33 to 35.

Figure 36A:
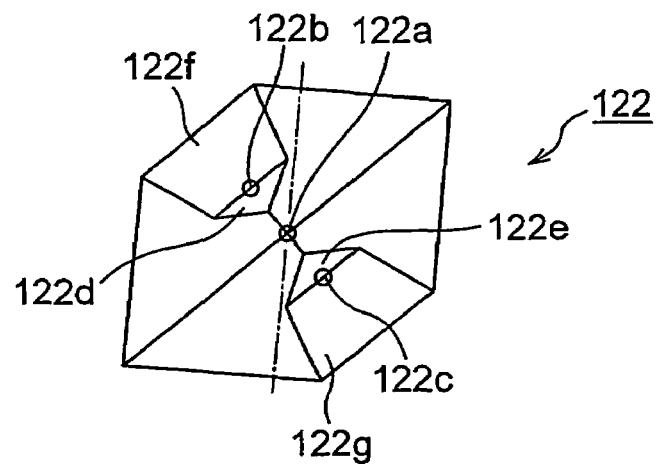
FIG. 36(a) is a plan view of the splitting prism forming the optical head shown in FIG. 32.
Figure 36B:
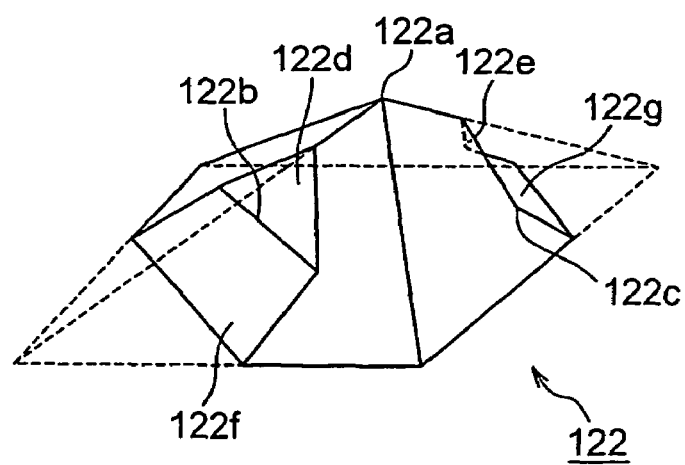
FIG. 36(b) is a perspective view of the splitting prism forming the optical head shown in FIG. 32.

Similarly to the splitting prism 85, described above, the splitting prism 122 includes a first splitting portion 122a, arranged in the vicinity of the focal point of the return light from the optical disc 2 of the main beam, as an order zero light beam, diffracted by the diffraction lattice for generating three beams 86, and second splitting portions 122b, 122c, arranged in the vicinity of the focal points of the return light from the optical disc 2 of the side beams, as the order one light beams diffracted by the diffraction lattice for generating three beams 86, as shown in FIG. 36.

In the splitting prism 122, shown in FIG. 36, two of four ridge lines of a substantially square pyramid, lying in opposition to each other, are cut partway, while the substantially square bottom side is cut, to form first inclined surfaces 122d, 122e for the side beams and second inclined surfaces 122f, 122g for the side beams. The first splitting portion 122a is an apex point in case the square shape of the square-shaped pyramid is the bottom surface, while the second splitting portions 122b, 122c are boundary lines between the first inclined surfaces 122d, 122e and the second inclined surfaces 122f, 122g.

The first splitting portion 122a of the splitting prism 122 is arranged at a focal point position of the return light of the main beam, incident on the splitting prism 122, for spatially splitting the return light of the main beam into four portions. The second splitting portions 122b, 122c are arranged at the focal point positions of the return light of the side beams for spatially splitting the return light of the side beams into respective two portions.

The light condensing optical component 121c condenses plural light beams, split by the splitting prism 122, and routes the condensed light beams to the light receiving unit 84, as shown in FIGS. 34 and 35. That is, since the light beams are condensed on the splitting surface of the splitting prism 122, these light beams are diverged after splitting by the splitting prism 122. The light condensing optical component 121c condenses these diverging as-split light beams to reduce production costs of the light receiving unit, while deriving a certain merit in frequency characteristics.

The light condensing optical component 121c is formed by a spherical surface, a non-spherical surface, a free curved surface or combinations thereof. Meanwhile, the light beams obtained on splitting the return light from the optical disc by the splitting prism are not necessarily rotation-symmetric. Thus, if the free curved surfaces are used for the light condensing optical component 121c, the light beams may be condensed to a smaller beam diameter.

The optical path of the laser light, radiated from the light source 22 of the optical head 120, is hereinafter explained.

Referring to FIG. 32, the light beams, radiated from the radiating units 22a, 22b of the light source 22, are incident on the composite optical component 121, and are radiated after diffraction by the diffraction lattice for optical path synthesis 121a, in such a manner that the optical axes of the radiating light of long wavelength and the radiating light of short wavelength, radiated from the radiating units 22a, 22b, mounted in proximity to the double wavelength semiconductor laser unit, will be confounded with each other on the light incident site to the splitting prism 122.

The light beam, radiated from the diffraction lattice for optical path synthesis 121a, is split into three beams, namely a zero order diffracted light (referred to below as main beam) and ±one order light beams (referred to below as side beams), by the diffraction lattice for generating three beams 86, and is then radiated, so as to be then reflected by the first half-mirror unit 81a of the half-mirror surface of the beam splitter 81. Since the first half-mirror unit 81a has a reflectance of approximately 80%, the light beam, radiated from the light source 22, is able to reach the optical disc 2 without losing its power. The light transmitted through the half-mirror surface does not affect the subsequent process.

The light beam reflected by the first half-mirror unit 81a of the beam splitter 81 is collimated by the collimator lens 26 and restricted by the aperture stop 35 so as to be condensed by the objective lens 27 on the recording surface 15 of the optical disc 2.

The light condensed by the optical disc 2 is reflected thereby, and the main and side beams, referred to below collectively as the return light, are transmitted through the objective lens 27 and the collimator lens 26 so as to be re-incident on the beam splitter 81. The return light, incident on the beam splitter 81, is transmitted through the first half-mirror unit 81a, reflected by the mirror surface 81c and radiated after transmission through the second half-mirror unit 81b. The return light, reflected by the first half-mirror unit 81a and the second half-mirror unit 81b of the half-mirror surface when the return light makes entrance to or exits from the beam splitter 81 does not affect the subsequent process. The return light, radiated from the beam splitter 81, is parallel to the outgoing light radiated from the light source 22 to fall on the beam splitter 81.

Thus, the return light from the optical disc 2 is reflected by the mirror surface 81c, opposite to the half-mirror surface, and is re-radiated from the half-mirror surface, so as to be parallel to the light radiated from the light source 22, without dependency on the mounting angle or the error in thickness of the beam splitter.

The return light, transmitted through and radiated from the second half-mirror unit 81b of the beam splitter 81, is separated from the optical path, emanating from the light source 22, to fall on the aberration correction lens 87, where the light is corrected for aberrations and radiated towards the composite optical component 82.

The return light, re-incident on the composite optical component 121, falls on the splitting prism 122, as shown in FIGS. 33 to 35. Of the return light, incident on the splitting prism 122, the main beam, incident on the apex point or its vicinity, is refracted in different directions, by respective four sides of the square-shaped pyramid, forming the apex point, as the first splitting portion 85a, and is thereby split into four light beams. These light beams are incident on light-receiving areas A to D of the photodetector for the main beam 84a, placed directly below the composite optical component 121.

Of the return light, incident on the composite optical component 121, the side beams, incident on the boundary line between the first and second inclined surfaces, as the second splitting units 85b, 85c, are refracted in different directions, by the first and second inclined surfaces, and thereby split into two light beams, which then are reflected by the mirror surface 121b and condensed by the light condensing optical component 121c so as to be incident on light-receiving areas E, F, G and H of the photodetector for side beams 84b, placed directly below the composite optical component 121.

The mirror surface 121b may be used as a total reflection surface, with the angle of incidence of the return light not less than the critical angle of reflection.

The first light receiving unit 84a is split into four, namely the light receiving areas A, B, C and D, so that the four main beams, obtained on splitting by the splitting prism 122, are incident on different ones of the four light receiving areas, as shown in FIGS. 29 and 30.

There are two photodetectors 84b for the side beams, on both sides of the photodetector for the main beam 31, and are respectively split into light receiving areas E and F and into light receiving areas G and H. The two side beams, obtained on splitting by the second splitting units 85b, 85c, are designed to fall on the respective different light receiving areas.

The methods for calculating the focusing error signals and the tracking error signals in the optical head 120, constructed using the above-described optical system, and the recording and/or reproducing apparatus 1, employing the optical head, are the same as those in the optical head 80, described above, and hence are not explained specifically. The focusing position may be optimally controlled by the so produced focusing error signals, and tracking servo may be applied by the tracking error signals.

The light condensing optical component of the optical head 120, embodying the present invention, condenses plural light beams, split by the splitting prism, thus enabling the size of the light receiving unit to be reduced, in contradistinction from the conventional optical disc in which the light beam split by the light splitting means is diverged and hence a light receiving unit of a larger size is required. Thus, production costs of the light receiving unit may be reduced, while a certain merit may be acquired in frequency characteristics.

With the optical head 120, the splitting prism 122 is responsible for the beam splitting function for obtaining the push-pull signals for the main and side beams, and hence the requirement for position accuracy of the photodetector relative to the incident beam position may be lessened. That is, if only a proper area is maintained for each of the four light receiving surfaces of the photodetector for the main beam and for each of the two light receiving surfaces of the photodetector for the side beams, it is only required that the main and side beams fall on the respective surfaces, while it does not matter on which location of each surface falls the light beam, so that a high position accuracy is not required. That is, optimum focusing and tracking error signals may be generated without requiring stringent position accuracy, and hence it is possible to lesson the requirement for position accuracy of beam splitting lines of the photodetector, to suppress the photodetector assembling cost on the optical pickup device and the production cost of the photodetector, and to improve the operational reliability. Moreover, since the light beam is condensed by light condensing means after beam splitting, the photodetector pattern may be reduced, while the production cost for the photodetector may be reduced.

With the optical head 120 according to the present invention, the beam splitter 81, having the first half-mirror unit 81a, second half-mirror unit 81b and the mirror surface 81c, collimates the return light, the optical path has been branched, so that the return light is parallel to the outgoing light from the light source, and hence the optimum focusing error signals may be obtained without being affected by the mounting angle or the thickness of the optical path branching optical components.

Moreover, with the recording and/or reproducing apparatus, according to the present invention, in which the light splitting means of the optical head splits the light beam before the light beam falls on the photodetector, the requirement for position accuracy of the light receiving surface of the photodetector can be lessened to improve the operational reliability, and hence the recording and/or reproducing operation can be carried out satisfactorily.

A plate-shaped optical component, formed as one with the diffraction lattice for generating three beams, and with the aberration correction device, may be provided, as in the above-described optical head 80. With the optical head according to the present invention, in which both the light beam of the ongoing optical path and the light beam of the return optical path traverse the same optical component, it is possible to enlarge the gamut of selection of the shape and the production process of the base portion of the optical head, the shape or the arranging method of the other components, so far determined by the stringent position accuracy of the light receiving unit and the light emitting unit. If, due to tilt of an optical component, the ongoing light undergoes optical axis deviation, such deviation is canceled and removed by the return light again traversing the component, so that the relative positions of the light receiving and light emitting units are not changed. The result is that the operational reliability by the accuracy of the components and the degree of freedom in designing may be improved, while the number of the alternative routes of the production method may be increased to suppress the cost of the optical head. Hence, it is possible to provide an optical head of low cost and high reliability and a recording and/or reproducing apparatus employing the optical head.

In the optical head 120, the diffraction lattice for generating three beams 86 and the aberration correction lens 87 are provided between the composite optical component 82 and the beam splitter 81. However, the diffraction lattice for generating three beams and the aberration correction lens may also be provided between the beam splitter 81 and the objective lens 27.

Figure 37:
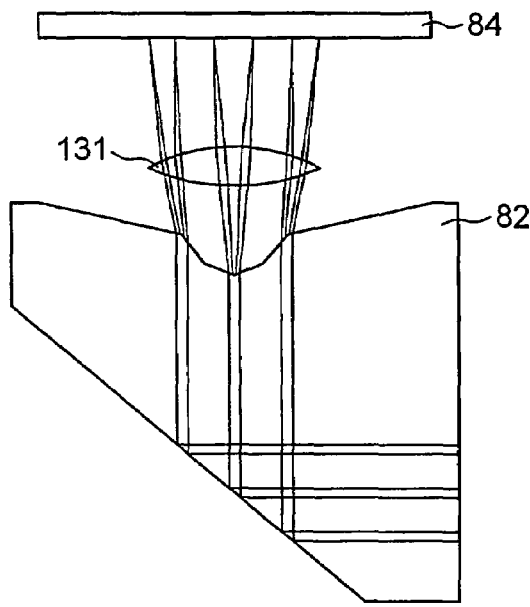
FIG. 37 is a cross-sectional view showing an illustrative light converging means forming the optical head shown in FIG. 32.

The light condensing means may also be a light condensing lens 131 provided on an optical path between the light splitting means and the light receiving unit, as shown in FIG. 37. In this case, the composite optical component used is of the shape similar to the shape of the composite optical component 82 of the optical head 80 described above.

Figure 38:
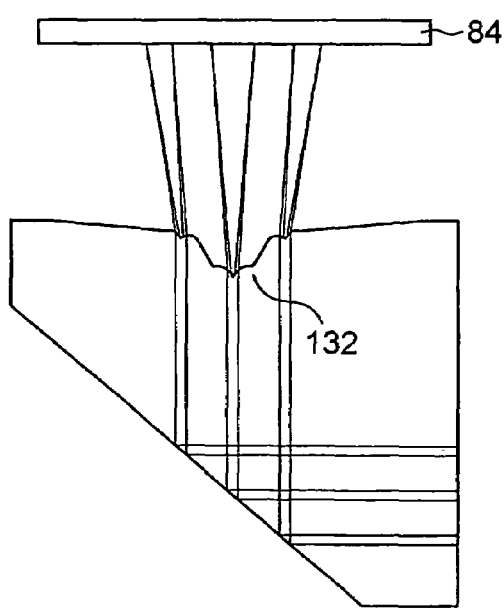
FIG. 38 is a cross-sectional view showing a further illustrative light condensing means forming the optical head shown in FIG. 32.

The light splitting means and the light condensing means may be combined together so as to have a light splitting condensing means 132 shown in FIG. 38. This light splitting condensing means 132 is provided to the composite optical component and has a splitting surface presenting a curvature. The light splitting condensing means splits light beams and condenses the light beams on the light receiving unit.

Figure 39:
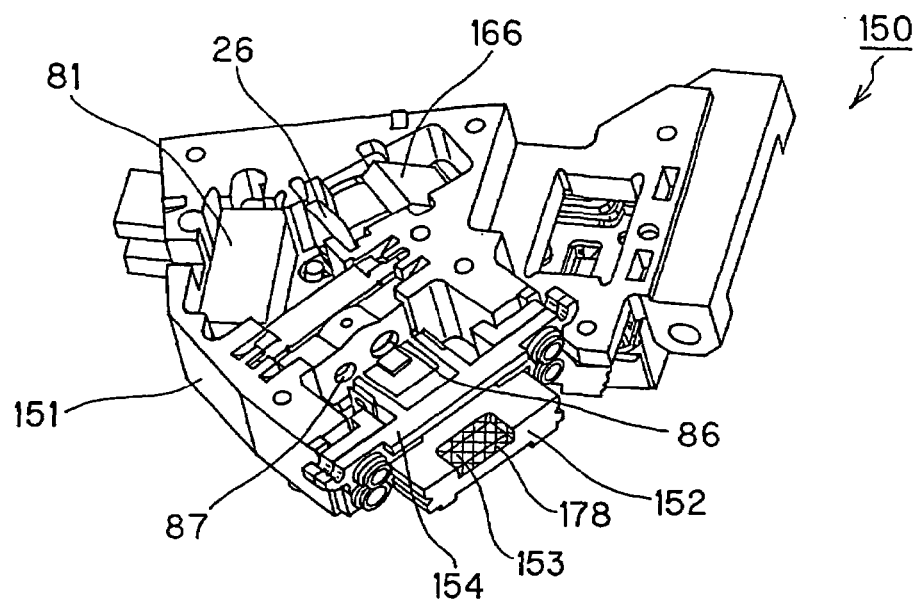
FIG. 39 is a perspective view showing a specified structure of an optical head according to the present invention.

The above-described optical system is configured as shown for example in FIG. 39. The optical head, shown in FIG. 39, shows a further concrete structure of the optical head 80. This concrete structure may, however, be applied to the case of the optical heads 21, 42, 60 or 120 as well.

An optical head 150, shown in FIG. 39, is made up by a slide base 151, a metal holder 152, mounted to the slide base 151, a substrate of ceramics 153, mounted to the metal holder 152, as an assembly of a substrate or another heat dissipating member and a wiring means, and a prism unit 154, mounted to the slide base 151 for holding the composite optical component 82.

In other words, the optical head 150 includes a first unit, made up by a metal holder 152, carrying thereon a laser unit and a light receiving unit, and a substrate of ceramics 153, a second unit, which is a prism unit 154, carrying thereon a beam splitting optical component, and a third unit, which is a slide base 151, carrying thereon other optical components and the circuitry.

Figure 40:
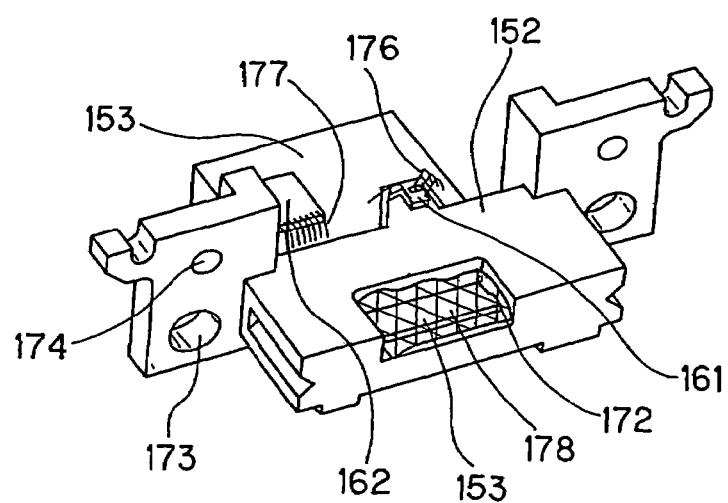
FIG. 40 is a perspective view showing a metal holder forming the optical head according to the present invention.
Figure 41:
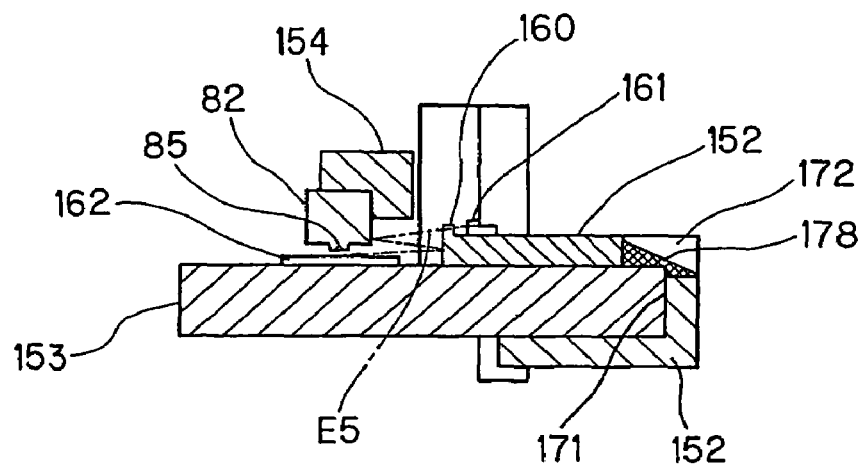
FIG. 41 is a cross-sectional view showing a metal holder and a prism holder of the optical head according to the present invention.

The metal holder 152 includes a plug-in recess 171 for plugging-in and securing the substrate of ceramics 153, as shown in FIGS. 40 and 41. The metal holder 152 includes an opening 172, such that, on plugging-in the substrate of ceramics 153 in the plug-in recess 171, the substrate of ceramics 153 faces outwards across the upper surface and the lateral surface opposite to the plug-in recess 171. The substrate of ceramics 153 is inserted in the plug-in recess 171 of the metal holder 152, and may be secured e.g. by soldering, at 178, by taking advantage of the opening 172.

This metal holder 152 is formed by zinc die-casting. Meanwhile, the metal holder 152 may be formed of diecast metal, such as magnesium or aluminum, instead of by zinc diecasting. The metal holder 152 may also be formed by casting aluminum, bronze or copper or by a metal forming member, such as press, in addition to being formed of diecast metal. The metal holder 152 may also be a clad material, obtained on cladding copper or aluminum. Solder plating free of lead is applied to the metal holder 152 in order to secure the prism unit 154. This plating may be tin plating.

This metal holder 152 is provided with a mounting hole 173, operating as a first mounting adjustment unit for adjusting the mounting position thereof to the slide base 151, and for securing the metal holder 152 to the slide base 151, using a set screw, not shown, in such a manner that the center of intensity of the laser beam radiated from the laser unit, that is, the optical path of the outgoing light, will be coincident with the center of the objective lens, as shown in FIGS. 39 and 40. Although the slide base 151 and the metal holder 152 of the optical head 150 are position-adjusted and secured to each other, using a set screw, these may also be secured to each other by other suitable securing means, such as soldering.

The substrate of ceramics 153, as a thermally conductive substrate, is plugged into the plug-in recess 171 of the metal holder 152 and secured in position by soldering in the opening 172. By soldering the substrate of ceramics 153 to the metal holder 152, connection may be made with high thermal conductivity, thereby improving heat radiating characteristics. By plugging in the substrate of ceramics 153 in the plug-in recess 171 of the metal holder 152, the contact area may be increased to improve the heat radiating characteristics further.

A laser chip 161, as a light source 22, is mounted on the metal holder 152. A PDIC (Photo Detect IC) 162, operating as the first light receiving unit 84a and the second light receiving unit 84b, is mounted on the substrate of ceramics 153. This laser chip 161 and the PDIC 162 are electrically connected to the substrate of ceramics 153 by wire bonding at 176, 177. A flexible substrate is bonded to the substrate of ceramics 153 by a film-shaped thermosetting adhesive or a liquid adhesive for coupling electrical input/output signals across the laser chip 161 and the light receiving unit. The PDIC 162, provided to the substrate of ceramics 153, is located on the substrate of ceramics 153, which is high in tenacity and thermal conductivity, so that the PDIC is stable as a light receiving surface and transmits the generated heat superbly to the metal holder 152.

The heat generated in the laser chip 161 is transmitted to the metal holder 152 for dissipation. The laser chip 161 is directly mounted to the metal holder 152, this metal holder 152 is formed of a highly thermally conductive material, and is of the shape with only small thermal resistance, for improving thermal conductivity. Moreover, the metal holder is of a large surface area for improving heat dissipation characteristics. The metal holder 152 is thermally connected by a set screw or solder to the slide base 151 to improve the heat radiation characteristics appreciably, whilst the temperature of the portion of the metal holder 152 carrying the laser chip 161 may be suppressed to a lower value. The heat yielded in the PDIC 162 is transmitted via the substrate of ceramics 153 to the metal holder 152 for dissipation. Since the PDIC 162 is directly mounted to the metal holder 152 through the substrate of ceramics 153, heat may be transmitted through the substrate of ceramics 153 to the metal holder 152 for dissipation. The PDIC 162 is not limited to being mounted on the substrate of ceramics 153. As a method not employing the substrate of ceramics, the PDIC may be mounted on another heat dissipating member and a flexible substrate having wiring means may be used for electrical connection of the PDIC. The PDIC 162 may be mounted to a heat dissipating member provided with the laser chip 161 and a flexible substrate having wiring means may be used for electrical connection of the PDIC.

The metal holder 152 is provided with a stray light stop lug 160 for preventing the light radiated from the laser chip 161 from being directly incident on the light receiving unit, as shown in FIG. 41. The stray light stop lug 160 is able to prevent stray light E5 of the laser light radiated from the laser chip 161 from being incident on the light receiving unit.

Figure 42:
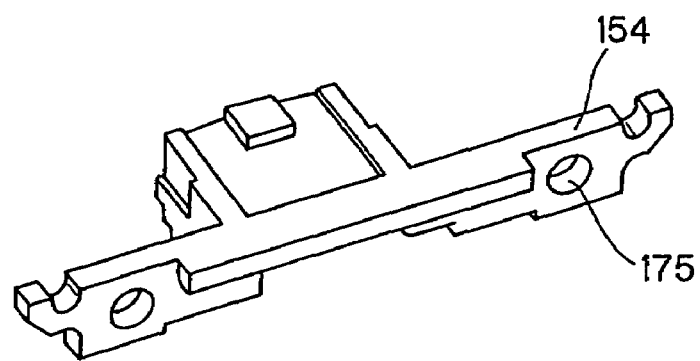
FIG. 42 is a perspective view showing the prism holder of the optical head according to the present invention.

The prism unit 154 holds the composite optical component 82, including the splitting prism 85, as shown in FIGS. 41 and 42. The prism unit 154 includes a mounting hole 175, as a second mounting adjustment unit for adjusting the mounting position of the prism unit relative to the slide base 151 and for securing the prism unit to the slide base 151 and to the metal holder 152. The prism unit 154 is secured to the slide base 151 and to the metal holder 152 by adjusting the positions thereof relative to the slide base 151 and to the metal holder 152 and by tightening the set screws. The set screws are tightened via an insertion through-hole 174 of the metal holder 152.

By adjusting the mounting position by the mounting hole 175, as second mounting adjustment means, the prism unit 154 is able to hold the composite optical component 82 at a position where the splitting prism 85 faces the PDIC 162, at a position where the diffraction lattice for optical path synthesis 82a of the composite optical component 82 faces the laser chip 161.

The slide base 151 is provided with an objective lens 27 for condensing the light radiated from the laser chip 161 on the optical disc, and a beam splitter 81 for branching the optical path of the return light reflected by the optical disc and for collimating the branched return light so as to be parallel to the light radiated from the light source. A collimator lens 26 and a mirror 166 for routing the light beam towards the objective lens and the disc surface are provided, in this order, looking from the beam splitter 81, between the beam splitter 81 and the objective lens 27.

On the incident light side surface of the slide base 151, there is mounted a diffraction lattice for generating three beams 86 between the composite optical component 82 and the beam splitter 81. On the return light side surface of the slide base 151, there is mounted an aberration correction lens 87, as an aberration correcting means, between the composite optical component 82 and the beam splitter 81. The diffraction lattice for generating three beams 86 and the aberration correction lens 87 are secured in position by mounting an optical component mounting member 164 to an optical component mounting unit 165 of the slide base.

The mounting unit of the slide base 151 and a mounting tapped hole 173 of the metal holder 152 are secured together by a set screw, whereby the metal holder 152 may be adjusted in its position, while the slide base 151 and the metal holder 152 may be secured to each other, as shown in FIG. 39.

Figure 43:
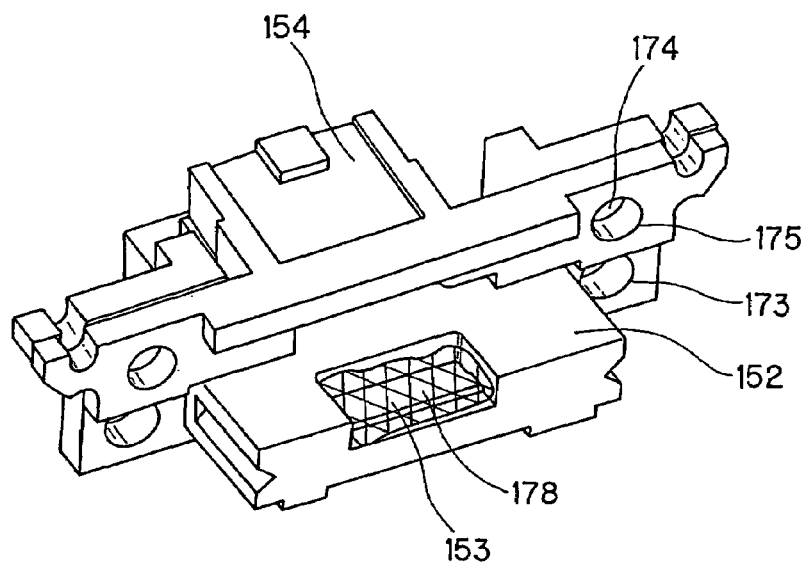
FIG. 43 is a perspective view showing the metal holder and the prism holder of the optical head according to the present invention.
Figure 44:
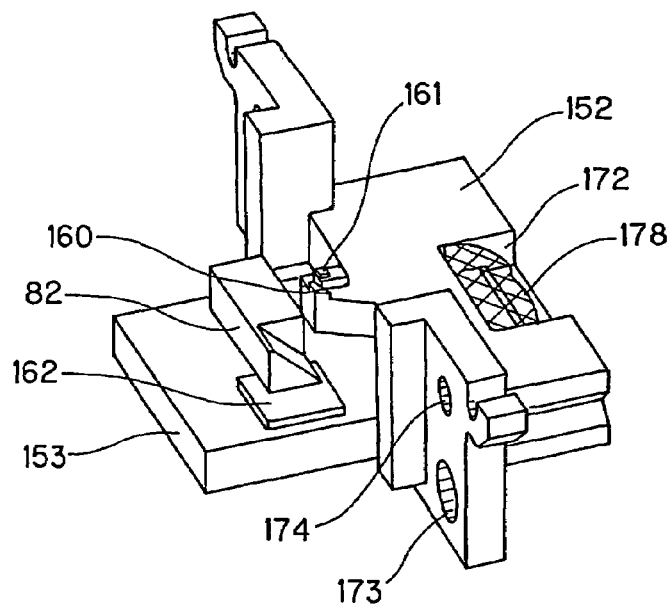
FIG. 44 is a perspective view showing the position relationship of the light source, light receiving unit and the composite optical component forming the optical head according to the present invention.
Figure 45:
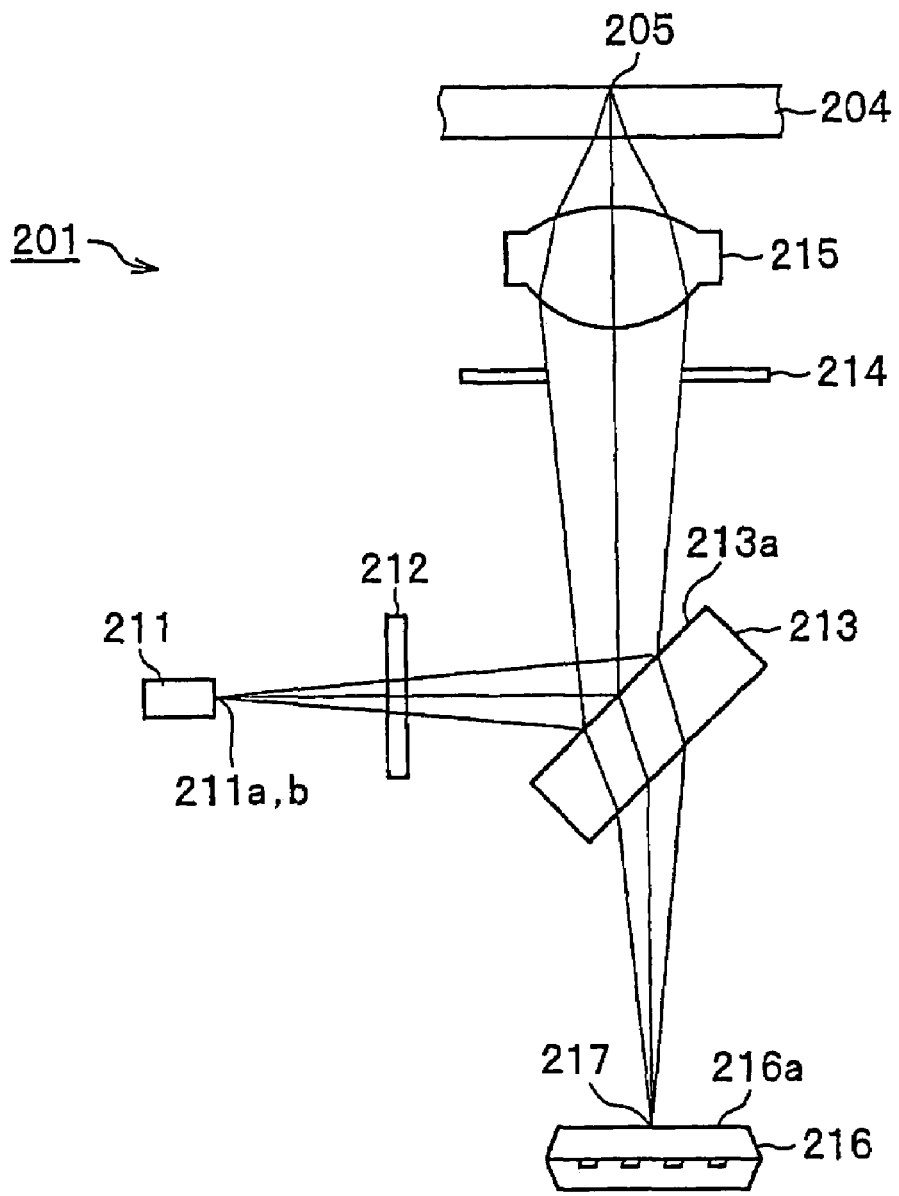
FIG. 45 shows schematics of an optical system of a conventional optical head.
Figure 46A:
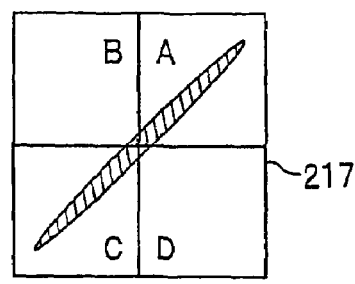
FIG. 46(a) shows the photodetector when the objective lens of the conventional optical head is at a location closer to the focal position with respect to the optical disc.
Figure 46B:
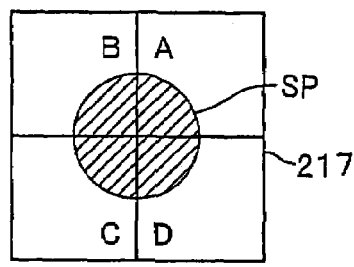
FIG. 46(b) shows the photodetector when the objective lens of the conventional optical head is at a location corresponding to the focal position with respect to the optical disc.
Figure 46C:
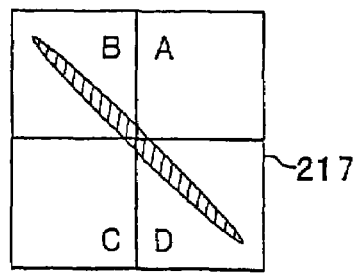
FIG. 46(c) shows the photodetector when the objective lens of the conventional optical head is at a location remoter than the focal position with respect to the optical disc.

Moreover, the prism unit 154, carrying thereon the composite optical component 82, may be secured in position to the slide base 151, by tightening a set screw in the mounting hole 175 of the prism unit 154 in the correct position, as shown in FIG. 43. The positions of the optical components may be adjusted at this time by tightening the set screw inserted in the mounting hole 175 in the prism unit 154 and in the insertion through-hole 174 of the metal holder 152. That is, by the insertion through-hole 174 and the mounting hole 175, the position relationships between the laser chip 161 and the diffraction lattice for generating three beams 86 and between the light receiving unit and the splitting prism 85 may be adjusted, as shown in FIG. 44.

The optical path of the laser light, radiated from the laser chip 161, as the light source, is the same as that in the case of the optical head 80, described above, and hence is not explained specifically.

In the optical head 150, the method for calculating the focusing error signals and the tracking error signals is the same as in the optical head 80 described above and hence is omitted for simplicity. The focusing position can be optimally controlled by the so produced focusing error signals, while tracking servo may be applied based on the tracking error signals.

With the optical head 150, according to the present invention, in which the beam splitter 81, provided with the half-mirror units 81a, 81b and with the mirror surface 81c, collimates the branched return light, so as to be parallel to the radiated light from the light source, superb focusing error signals may be produced without being affected by the mounting angle or the thickness of the optical path branching optical component. Moreover, by splitting the light beam by e.g. a splitting prism, before the light beam falls on the photodetector, it is possible to lessen the requirements pertaining to the photodetector light receiving surface.

That is, with the optical head 150, the metal holder may be mounted to the slide base by the first mounting adjustment unit, while the prism unit 154, carrying thereon the splitting prism 85, may be mounted by the second mounting adjustment unit to the slide base 151. It is then sufficient, at the time of adjusting the splitting prism 85 by this second mounting adjustment unit, to perform position adjustment so that the light beam will be incident on the respective light receiving areas. It is possible in this manner to simplify the position adjustment during the assembling process in the optical head manufacturing process and photodetector position adjustment as well as to improve the operational reliability.

In the optical head 150, in which the laser chip 161 is arranged on the metal holder 152 of high thermal conductivity, the PDIC 162 is arranged on the substrate of ceramics 153 and the metal holder 152 exhibiting high thermal conductivity dissipates heat via this substrate of ceramics 153, the laser chip 161 is able to dissipate heat to suppress the laser temperature as well as to extend the useful life of the laser unit. In the optical head 150, the light source and the light receiving unit, as main heat source, are arranged in one unit which is formed of a material exhibiting high heat radiation performance, and hence it is possible to dissipate heat efficiently.

That is, with the optical head 150, the optical performance may be kept optimum without requiring high positioning accuracy for the optical system, while the heat radiating effect may be improved extremely readily.

With the optical head 150, set screws or the solder is used as means for securing the metal holder 152, mounting the laser chip 161 by chip-mounting, to the slide base 151, as adjustment is made so that the center of intensity of the laser beam, radiated from the laser unit, will be coincident with the center of the objective lens 27, so that it is possible to reduce the number of component parts and the production cost.

With the optical head 150, the substrate of ceramics 153 is used as heat dissipating means, which is connected by wire bonding to the laser chip 161 and to the PDIC 162, it becomes possible to reduce the wiring space and the size of the optical head, thereby decreasing the number of component parts.

With the optical head 150, the prism unit 154 is secured to the slide base 151 by set screws or by soldering, and hence the deviation of position coincidence between the center of the intensity of the laser beam radiated from the laser unit and the center of the objective lens may be diminished. On the other hand, position changes against environmental stress due to temperature changes with lapse of time may be reduced to raise the reliability of the optical head itself.

With the optical head, the stray light stop lug 160 is provided to the metal holder 152, so that it becomes possible to prevent the stray light radiated from the laser chip 161 from falling on the light receiving unit 84. Since there is no necessity of mounting the stray light stop member as a separate component, it becomes possible to reduce the cost of component parts to diminish the number of the operational steps.

In the optical head 150, the PDIC 162 is provided with the first light receiving unit 84*a* and the second light receiving unit 84*b* as integral components. Alternatively, these units may also be formed by separate ICs. That is, the optical head may be provided with a PDIC as the first light receiving unit 84*a* and with an FPDIC (Front Photo Detect IC) as the second light receiving unit 84*b*.

Although the optical head according to the present invention is used for a recording and/or reproducing apparatus, it may also be used only for the recording apparatus or only for the reproducing apparatus.

What is claimed is:

1. An optical head comprising:
   a light source for radiating light of a preset wavelength;
   a light condensing optical component for condensing the light radiated from said light source on an optical disc and for condensing the return light from said optical disc;
   an optical path branching optical component for branching the optical path of the return light reflected from said optical disc and for collimating the branched return light so as to be parallel to the light radiated from said light source;
   a composite optical component arranged at a position on which falls the return light branched by said optical path branching optical component, wherein said position is a vicinity of a focal point of the return light, said composite optical component including light splitting means for spatially splitting at least the branched return light; and
   a light receiving unit having a plurality of light receiving areas for receiving a plurality of return light beams obtained on spatial splitting by said light splitting means.

2. The optical head according to claim 1 wherein said light source radiates a plurality of light beams of respective different wavelengths and wherein the return light beams from said optical disc of said plural light beams of the respective different wavelengths are incident on substantially the same site on said light splitting means.

3. The optical head according to claim 1 or 2 further comprising
   a diffraction component arranged on an optical path between said light source and said light condensing optical component and adapted for diffracting the light radiated from said light source for splitting the light into a plurality of light beams, wherein
   the return light from said optical path branching optical component traverses an area of said diffraction component other than an area thereof exhibiting the diffractive effect, said light receiving unit receiving return light from said optical disc of the plural beams obtained on diffraction by said diffraction component.

4. The optical head according to claim 3 wherein
   said composite optical component is arranged on an optical path between said optical path branching optical component and said light receiving unit; and wherein
   the light radiated from the light source traverses an area other than an area of said light splitting means within said composite optical component.

5. The optical head according to claim 2 wherein
   said light source includes a plurality of radiating units arranged in proximity to each other for radiating light beams of respective different wavelengths; and wherein
   an optical path synthesizing optical component is provided between said light source and said light condensing optical component for synthesizing respective optical paths of the radiated light from said radiating units to form an optical path confounded with the optical axis of said light condensing optical component; the return light from said optical path branching optical component traversing an area other than an area thereof exhibiting the optical path synthesizing effect of said optical path synthesizing optical component.

6. The optical head according to claim 2 wherein said light source includes a plurality of radiating units arranged in proximity to each other for radiating light beams of respective different wavelengths; and wherein
   an optical path synthesizing optical component is provided between said optical path branching optical component and said light splitting means for synthesizing respective optical paths of return light from the optical disc of the radiated light from said radiating units for meeting at the same location on said light splitting means; the light radiated from said light source traversing an area of said optical path synthesizing optical component other than an area thereof exhibiting the optical path synthesizing effect.

7. The optical head according to claim 1 wherein said light splitting means is a substantially square-shaped prism for dividing the return light incident on said light splitting means into four portions, said light receiving unit having its light receiving area split into four areas, said four portions of the return light falling on the four light receiving areas, produced on splitting, to produce a focusing error signal.

8. The optical head according to any one of claims 5 to 7 wherein said composite optical component includes at leas tone reflecting means.

9. The optical head according to claim 1 further comprising
   a monitor light receiving component for monitoring an output of light radiated from said light source;
   said composite optical component including control light routing means for separating the light radiated from said light source into signal light condensed on said optical disc and control light, said control light routing means routing said control light to said monitor light receiving component.

10. The optical head according to claim 9 wherein said composite optical component separates the light radiated from said light source into signal light condensed on said optical disc and into said control light separated by said control light routing means; and wherein
said composite optical component radiates said control light by at least one internal reflection including reflection on a reflective surface arranged obliquely so as to be parallel to the optical axis of said signal light.

11. The optical head according to claim 1 further comprising
a diffraction component arranged on an optical path between said light source and said light condensing optical component for diffracting the light radiated from said light source for splitting the radiated light into a plurality of light beams;
said light splitting means being composed of first splitting means arranged in the vicinity of the focal point of the return light from said optical disc of the order zero diffracted light diffracted by said diffraction component, for splitting said order zero diffracted light into a plurality of light beams, and second splitting means arranged in the vicinity of the focal point of the return light from said optical disc of the±order one diffracted light diffracted by said diffraction component, for splitting said±order one diffracted light into a plurality of light beams;
said light receiving unit receiving the plural order zero diffracted light beams obtained on splitting by said first splitting means for generating a focusing error signal, said light receiving unit receiving the plural order one diffracted light beams obtained on splitting by said second splitting means for generating a tracking error signal.

12. The optical head according to claim 11 wherein
said first splitting means and the second splitting means are formed on one and the same optical component.

13. The optical head according to claim 11 wherein
said light splitting means is a prism having a plurality of planar facets.

14. The optical head according to claim 1 further comprising
light condensing means arranged on an optical path between said light splitting means and said light receiving unit having said plural light receiving areas for condensing said plural return light beams obtained on splitting by said light splitting means on said light receiving areas.

15. The optical head according to claim 14 wherein
said light condensing means is formed on said composite optical component.

16. The optical head according to claim 1 wherein
said light splitting means is formed by a free curved surface and spatially splits the return light while condensing a plurality of return light beams split on said light receiving areas.

17. An optical head comprising
a light source for radiating light of a preset wavelength;
a light condensing optical component for condensing the light radiated from said light source on an optical disc and for condensing the return light from said optical disc;
an optical path branching optical component for branching the optical path of the return light reflected from said optical disc and for collimating the branched return light so as to be parallel to the light radiated from said light source;
a composite optical component arranged a position on which falls the return light branched by said optical path branching optical component, wherein said position is a vicinity of a focal point of the return light, said composite optical component including light splitting means for spatially splitting at least the branched return light; and
a light receiving unit having a plurality of light receiving areas for receiving a plurality of return light beams obtained on spatial splitting by said light splitting means;
said light source being mounted on a heat dissipating member;
said heat dissipating member being provided with an assembly of a substrate or another heat dissipating member and wiring means;
said light receiving unit being arranged on said assembly of the substrate or the other heat dissipating member and wiring means.

18. The optical head according to claim 17 further comprising
a prism unit for holding said composite optical component; and
a slide base for mounting said optical path branching optical component thereon;
said heat dissipating member being mounted to said slide base so as to be adjustable in the position thereof;
said prism unit being mounted to said slide base, carrying said heat dissipating member, so as to be adjustable in the position thereof.

19. The optical head according to claim 17 wherein
said assembly including said substrate or the other heat dissipating member and wiring means is provided with a terminal that permits wire bonding.

20. The optical head according to claim 17 wherein
said heat dissipating member includes a stray light stop lug for protruding in the space between said light source and the light receiving unit.

21. A recording and/or reproducing apparatus including an optical head for recording and/or reproducing the information for an optical disc, and disc rotating driving means for rotationally driving said optical disc, wherein said optical head comprises:
a light source for radiating light of a preset wavelength;
a light condensing optical component for condensing the light radiated from said light source on said optical disc and for condensing the return light from said optical disc;
an optical path branching optical component for branching the optical path of the return light reflected from said optical disc and for collimating the branched return light so as to be parallel to the light radiated from said light source;
a composite optical component arranged a position on which falls the return light branched by said optical path branching optical component, wherein said position is a vicinity of a focal point of the return light, said composite optical component including light splitting means for spatially splitting at least the branched return light; and a light receiving unit having a plurality of light receiving areas for receiving a plurality of return light beams obtained on spatial splitting by said light splitting means.

22. The recording and/or reproducing apparatus according to claim 21 wherein said optical head is arranged between said light source and said light condensing optical component and adapted for diffracting the light radiated from said light source for splitting the light into a plurality of light beams, wherein
the return light from said optical path branching optical component traverses an area of said diffraction component other than an area thereof exhibiting the diffractive effect, said light receiving unit receiving return light from said optical disc of a plurality of light beams obtained on diffraction by said diffraction component.

23. The recording and/or reproducing apparatus according to claim 21 wherein said optical head includes a monitor light receiving component for monitoring the outputting of light radiated from said light source;
said composite optical component including control light routing means for separating the light radiated from said light source into signal light condensed on said optical disc and control light and for routing said control light to said monitor light receiving component.

24. The recording and/or reproducing apparatus according to claim 21 wherein said optical head further comprises
a diffraction component arranged on an optical path between said light source and said light condensing optical component for diffracting the light radiated from said light source for splitting the radiated light into a plurality of light beams;
said light splitting means being composed of first splitting means arranged in the vicinity of the focal point of return light from said optical disc of the order zero diffractedlight diffracted by said diffraction component, for splitting said order zero diffracted light into a plurality of light beams, and second splitting means arranged in the vicinity of the focal point of return light from said optical disc of the±order one diffracted light diffracted by said diffraction component, for splitting said±order one diffracted light into a plurality of light beams;
said light receiving unit receiving the plural order zero diffracted light beams obtained on splitting by said first splitting means for generating a focusing error signal and receiving the plural order one diffracted light beams obtained on splitting by said second splitting means for generating a tracking error signal.

25. The recording and/or reproducing apparatus according to claim 21 wherein said optical head further comprises
light condensing means arranged on an optical path between said light splitting means and said light receiving unit having said plural light receiving areas and configured for condensing said plural return light beams obtained on splitting by said light splitting means.

26. The recording and/or reproducing apparatus according to claim 21 wherein
said light splitting means is formed by a free curved surface and spatially splits the return light while condensing a plurality of return light beams split on said light receiving areas.

27. A recording and/or reproducing apparatus including an optical head for recording and/or reproducing the information for an optical disc, and disc rotating driving means for rotationally driving said optical disc, wherein said optical head comprises:
a light source for radiating light of a preset wavelength;
a light condensing optical component for condensing the light radiated from said light source on an optical disc and for condensing the return light from said optical disc;
an optical path branching optical component for branching the optical path of the return light reflected from said optical disc and for collimating the branched return light so as to be parallel to the light radiated from said light source;
a composite optical component arranged a position on which falls the return light branched by said optical path branching optical component, wherein said position is a vicinity of a focal point of the return light, said composite optical component including light splitting means for spatially splitting at least the branched return light; and
a light receiving unit having a plurality of light receiving areas for receiving a plurality of return light beams obtained on spatial splitting by said light splitting means;
said light source being mounted on a heat dissipating member;
said heat dissipating member being provided with an assembly of a substrate or another heat dissipating member and wiring means;
said light receiving unit being arranged on said assembly of the substrate or the other heat dissipating member and wiring means.

28. The optical head according to claim 3 wherein said light splitting means is a substantially square-shaped prism for dividing the return light incident on said light splitting means into four portions, said light receiving unit having its light receiving area split into four areas, said four portions of the return light falling on the four light receiving areas, produced on splitting, to produce a focusing error signal.

29. The optical head according to claim 3 wherein said composite optical component includes at least one reflecting means.

30. The optical head according to claim 4 wherein said composite optical component includes at least one reflecting means.

* * * * *

UNITED STATES PATENT AND TRADEMARK OFFICE
CERTIFICATE OF CORRECTION

PATENT NO. : 7,248,544 B2
APPLICATION NO. : 10/849158
DATED : July 24, 2007
INVENTOR(S) : Masahiro Saito et al.

It is certified that error appears in the above-identified patent and that said Letters Patent is hereby corrected as shown below:

Column 42, Lines 60-61:
"at leas tone" should read -- at least one --.

Column 44, Line 6:
"a position" should read -- at a position --.

Column 44, Line 61:
"a position" should read -- at a position --.

Column 45, Line 36:
"diffractedlight" should read -- diffracted light --.

Column 46, Line 23:
"a position" should read -- at a position --.

Signed and Sealed this

Sixth Day of November, 2007

JON W. DUDAS
*Director of the United States Patent and Trademark Office*